(12) United States Patent
Slone et al.

(10) Patent No.: US 8,719,773 B2
(45) Date of Patent: May 6, 2014

(54) WORKFLOW DATA BINDING

(75) Inventors: Kirk Slone, Calgary (CA); Daren Yong, Calgary (CA); Eric Jobin, Calgary (CA)

(73) Assignee: Open Text S.A., Luxembourg (LU)

( * ) Notice: Subject to any disclaimer, the term of this patent is extended or adjusted under 35 U.S.C. 154(b) by 489 days.

(21) Appl. No.: 12/353,849

(22) Filed: Jan. 14, 2009

(65) Prior Publication Data

US 2009/0319924 A1     Dec. 24, 2009

Related U.S. Application Data

(63) Continuation of application No. 11/747,888, filed on May 11, 2007, now abandoned.

(60) Provisional application No. 60/800,056, filed on May 12, 2006.

(51) Int. Cl.
G06F 9/44 (2006.01)

(52) U.S. Cl.
USPC .......................................................... 717/109

(58) Field of Classification Search
CPC ...................................................... G06F 8/34
USPC ................. 717/101, 172, 107, 109, 102, 502;
715/765, 769, 234, 764, 744, 760;
709/203, 205, 328, 310; 705/50;
719/313; 707/10, 102
See application file for complete search history.

(56) References Cited

U.S. PATENT DOCUMENTS

| | | | |
|---|---|---|---|
| 5,826,239 A | 10/1998 | Du et al. | |
| 5,974,418 A | 10/1999 | Blinn et al. | |
| 6,330,006 B1 | 12/2001 | Goodisman | |
| 6,339,838 B1 | 1/2002 | Weinman, Jr. | |
| 6,415,259 B1 | 7/2002 | Wolfinger et al. | |
| 6,429,880 B2 | 8/2002 | Marcos et al. | |
| 6,430,538 B1 | 8/2002 | Bacon et al. | |

(Continued)

FOREIGN PATENT DOCUMENTS

| | | |
|---|---|---|
| WO | WO2004/012109 A1 | 2/2004 |
| WO | PCT/AU03/00954 | 5/2004 |
| WO | WO2007090161 | 8/2007 |

OTHER PUBLICATIONS

Captaris, "Captaris Delivers Workflow Business Solutions", White paper—2004, pp. 1-8.*

(Continued)

*Primary Examiner* — Tuan A Vu

(74) *Attorney, Agent, or Firm* — Sprinkle IP Law Group

(57) ABSTRACT

A workflow data binding system facilitates binding of a data component to a feature of a software component. Prior to the binding, a graphical indication of the software component and a graphical indication of the feature of the software component are displayed. In addition, an indication of an element of the data component is displayed in a display area approximately adjacent to the displayed software component. The workflow data binding system receives a user input command to bind the data component to the feature of the software component. The user input command may include dragging the indication of an element of the data component from the data component display area to the feature of the software component and subsequently dropping it on the feature. As a result, the workflow data binding system automatically generates script or code that provides executable instructions to bind the feature of the software component to the data component.

21 Claims, 14 Drawing Sheets

(56) References Cited

U.S. PATENT DOCUMENTS

| | | | |
|---|---|---|---|
| 6,437,805 B1 | 8/2002 | Sojoodi et al. | |
| 6,442,563 B1 | 8/2002 | Bacon et al. | |
| 6,484,150 B1 | 11/2002 | Blinn et al. | |
| 6,553,563 B2 | 4/2003 | Ambrose et al. | |
| 6,621,505 B1 | 9/2003 | Beauchamp et al. | |
| 6,714,219 B2* | 3/2004 | Lindhorst et al. | 715/769 |
| 6,745,221 B1 | 6/2004 | Ronca | |
| 6,860,422 B2 | 3/2005 | Hull et al. | |
| 6,874,146 B1 | 3/2005 | Iyengar | |
| 6,904,412 B1 | 6/2005 | Broadbent et al. | |
| 6,938,240 B2 | 8/2005 | Charisius et al. | |
| 6,968,503 B1 | 11/2005 | Chang et al. | |
| 6,990,654 B2 | 1/2006 | Carroll, Jr. | |
| 7,017,123 B2 | 3/2006 | Chickles et al. | |
| 7,076,728 B2 | 7/2006 | Davis et al. | |
| 7,124,373 B1 | 10/2006 | Patil | |
| 7,127,716 B2 | 10/2006 | Jin et al. | |
| 7,134,090 B2 | 11/2006 | Kodosky et al. | |
| 7,143,343 B2 | 11/2006 | Bender et al. | |
| 7,159,185 B1 | 1/2007 | Vedula et al. | |
| 7,194,692 B2 | 3/2007 | Marcos et al. | |
| 7,321,864 B1 | 1/2008 | Gendler | |
| 7,424,717 B2 | 9/2008 | Blevins | |
| 7,428,495 B2 | 9/2008 | Dhar et al. | |
| 7,483,902 B2 | 1/2009 | Ghai et al. | |
| 7,539,982 B2 | 5/2009 | Stuart | |
| 7,634,756 B2 | 12/2009 | Bjornson et al. | |
| 7,640,548 B1 | 12/2009 | Yu et al. | |
| 7,657,827 B2 | 2/2010 | Sanabria et al. | |
| 7,810,099 B2 | 10/2010 | Dettinger et al. | |
| 2001/0045963 A1* | 11/2001 | Marcos et al. | 345/765 |
| 2002/0007405 A1 | 1/2002 | Bahadur | |
| 2002/0029376 A1 | 3/2002 | Ambrose et al. | |
| 2002/0040312 A1 | 4/2002 | Dhar | |
| 2002/0078432 A1 | 6/2002 | Charisius et al. | |
| 2002/0085020 A1 | 7/2002 | Carroll | |
| 2002/0123813 A1 | 9/2002 | Bickley | |
| 2002/0133635 A1* | 9/2002 | Schechter et al. | 709/310 |
| 2002/0165912 A1 | 11/2002 | Wenocur et al. | |
| 2002/0184610 A1* | 12/2002 | Chong et al. | 717/109 |
| 2003/0093433 A1 | 5/2003 | Seaman et al. | |
| 2003/0167277 A1* | 9/2003 | Hejlsberg et al. | 707/102 |
| 2003/0172196 A1* | 9/2003 | Hejlsberg et al. | 709/328 |
| 2003/0233273 A1 | 12/2003 | Jin et al. | |
| 2004/0003353 A1 | 1/2004 | Rivera et al. | |
| 2004/0006598 A1 | 1/2004 | Barbaglidamm et al. | |
| 2004/0078258 A1 | 4/2004 | Schultz et al. | |
| 2004/0088647 A1 | 5/2004 | Miller et al. | |
| 2004/0250213 A1 | 12/2004 | Shalabi et al. | |
| 2005/0015746 A1 | 1/2005 | Shukla et al. | |
| 2005/0066287 A1* | 3/2005 | Tattrie et al. | 715/769 |
| 2005/0066304 A1* | 3/2005 | Tattrie et al. | 717/101 |
| 2005/0091576 A1* | 4/2005 | Relyea et al. | 715/502 |
| 2005/0114405 A1 | 5/2005 | Lo | |
| 2005/0216830 A1 | 9/2005 | Turner et al. | |
| 2005/0262429 A1 | 11/2005 | Elder et al. | |
| 2005/0273272 A1 | 12/2005 | Brando et al. | |
| 2005/0283786 A1 | 12/2005 | Dettinger et al. | |
| 2006/0004827 A1 | 1/2006 | Stuart | |
| 2006/0047665 A1* | 3/2006 | Neil | 707/10 |
| 2006/0085342 A1* | 4/2006 | Chen et al. | 705/50 |
| 2006/0106637 A1 | 5/2006 | Johnson et al. | |
| 2006/0224432 A1 | 10/2006 | Li | |
| 2006/0282473 A1 | 12/2006 | Horrocks et al. | |
| 2007/0061695 A1 | 3/2007 | Sanabria et al. | |
| 2007/0074121 A1* | 3/2007 | Mullender et al. | 715/744 |
| 2007/0245302 A1* | 10/2007 | Grotjohn et al. | 717/109 |
| 2008/0278740 A1 | 11/2008 | Bird et al. | |
| 2011/0004490 A1 | 1/2011 | Backhaus | |
| 2011/0023049 A1 | 1/2011 | Dettinger et al. | |

OTHER PUBLICATIONS

Examiner's Report issued in Canadian Patent Application No. 2,640,739, dated Mar. 9, 2011, 2 pgs.

Extended European Search Report issued for European Patent Application No. 07 710 433.9, mailed Feb. 22, 2011, 7 pgs.
Office Action issued in U.S. Appl. No. 11/669,662, mailed Dec. 1, 2008, 23 pages.
Office Action issued in U.S. Appl. No. 11/669,662, mailed Aug. 10, 2009, 16 pages.
International Search Report issued in International Patent Application No. PCT/US07/61391, mailed Feb. 28, 2008, 3 pages.
Written Opinion issued in International Patent Application No. PCT/US07/61391, mailed Feb. 28, 2008, 6 pages.
International Preliminary Report on Patentability issued in International Patent Application No. PCT/US07/61391, mailed Jul. 23, 2008.
International Preliminary Report on Patentability issued in International Patent Application No. PCT/US07/68825, mailed May 9, 2009, 7 pages.
Castellanos, et al., iBOM: A Platform for Intelligent Business operation Management, Proceedings of the 21st International Concerence on Data Engineering, 2005, p. 1-12.
Continuous Business Process Management with HOLOSOFX BPM Suite and IBM MQSeries Workflow, ibm.com/redbooks, May 2002, p. 1-534.
Dan et al., Web services on demand: WSLA-driven automated management, IBM Systems, Journal, vol. 43, No. 1, 2004, pp. 136-158.
Gannon, et al., *A Quick Tour of LEAD via LEAD Portal & Application Orchestration*, Indiana University, Jul. 21-22, 2005, p. 1-46.
International Search Report and Written Opinion; International Patent Application No. PCT/US07/68825; Filed May 11, 2007; Applicant; Captaris, Inc.; Mailed: Jul. 17, 2008; 12 pages.
Schmidt, Building Workflow Business Objects, OOPSLA '98 Business Object Workshop IV, 1998, p. 1-14.
Senkul and Torosola, An Architecture for workflow scheduling under resource allocation constraints, Information Systems 30 (2005), p. 399-422.
Notice of Allowance issued in U.S. Appl. No. 12/703,531 mailed Sep. 1, 2011, 27 pages.
Nielsen et al., "Using Domino Workflow," IBM, May 2000, pp. 1-319.
Office Action issued in U.S. Appl. No. 13/306,512, mailed Jan. 26, 2012, 13 pages.
Russell et al., "Workflow Resource Patterns" 2004. p. 1-73.
Office Action issued in U.S. Appl. No. 11/486,397, mailed Mar. 10, 2010, 22 pages.
Levitus, et al., "MacWorld Microsoft Office 2001 Bible," IDG Books Worldwide, Inc., 2001, pp. 163-178. (Best available).
Office Action issued in U.S. Appl. No. 11/486,398, mailed Jul. 26, 2010, 16 pages.
"Captaris Announces Teamplate for .NET 4.1," CMSWire, Apr. 4, 2004, printed from http://www.cmswire.com/cms/portal/captaris-announces-template-for-net-41-000271.php on Jul. 14, 2010, 3 pages.
Captaris Workflow, powered by Teamplate, Captaris, 2005, 3 pages.
Captaris Workflow Technical Overview, Captaris, 2005, 4 pages.
Chen, Qiming, et al., "Multi-Agent Cooperation, Dynamic Workflow and XML for E-Commerce Automation," HP Laboratories Palo Alto, Oct. 1999, 10 pages.
Wang, Alf Inge, "Experience Paper: Using XML to Implement a Workflow Tool," NTNU, Trondheim, Norway, Apr. 4, 2001, 7 pages.
Tripathi, Anand R., et al., "Implementing Distributed Workflow Systems from XML Specifications," University of Minnesota Department of Computer Science, 2000, 9 pages.
Filho, Roberto Silveira Silva, "A Fully Distributed Architecture for Large Scale Workflow Enactment," International Journal of Cooperative Information Systems, vol. 12, No. 4, 2003, 16 pages.
Kay, Michael, "Building Workflow Applications with XML and Xquery," DataDirect Technologies, Inc., 2006, 10 pages.
Shegalov, German, et al., "XML-Enabled Workflow Management for E-Services Across Heterogeneous Platforms," The VLDB Journal, vol. 10, 2001, 13 pages.
Stauch, Marc, et al., "Design and Implementation of an XSL-T and XML-based Workflow System," XML Europe, 2001, 18 pages.
Office Action issued in U.S. Appl. No. 11/486,397, mailed Aug. 13, 2010, 16 pages.

(56) References Cited

OTHER PUBLICATIONS

Office Action issued in U.S. Appl. No. 10/938,118, mailed Oct. 29, 2007, 32 pages.
Office Action issued in U.S. Appl. No. 10/938,118, mailed May 14, 2008, 27 pages.
Office Action issued in U.S. Appl. No. 10/938,118, mailed Jan. 14, 2009, 19 pages.
Castellanos, et al., "IBOM: A Platform for Intelligent Business Operation Management," Proceedings of the 21st International Conference on Data Engineering, 2005, pp. 1-12.
Captaris, "Alchemy Workflow Solutions—Datasheet," Captaris, 2005, 4 pages.
Office Action issued in U.S. Appl. No. 10/938,118, mailed Nov. 3, 2009, 17 pages.
Office Action issued in U.S. Appl. No. 11/486,398, mailed Nov. 9, 2010, 20 pages.
Captaris, "Doculabs MarketFocus White Paper: Analysis of the Captaris Solution for Fixed Content Management," Doculabs, 2005, 18 pages.
Captaris, "Nexant Automates Energy Efficiency with Captaris Workflow, Case Study," 2005, 3 pages.
Sparta Systems, Inc., "TrackWise—User's Guide," 2000, 175 pages.
Teamware Group, "Teamware Flow 3.1 User's Guide," Third Edition Apr. 2000, 164 pages.
Marchetti, Andrea et al., "Xflow: An XML-Based Document Centric Workflow," WISE 2005, LNCS 3806, 2005, 14 pages.
Krishnan, Rupa et al., "Xdoc-WFMS: A Framework for Document Centric Workflow Management Lecture Notes in Computer Science," 2002, vol. 2464/2002, pp. 348-362.
Examiner's Report for Canadian Patent Application No. 2,443,454, mailed Jan. 25, 2011, 6 pgs.
Examiner's Report for Canadian Patent Application No. 2,451,164, mailed Feb. 16, 2011, 4 pgs.
Examiner's Report for Canadian Patent Application No. 2,640,739, mailed Mar. 23, 3012, 5 pgs.
Office Action issued in U.S. Appl. No. 13/306,512, mailed Jun. 12, 2012, 13 pages.
Office Action issued in U.S. Appl. No. 12/396,445, mailed Sep. 28, 2012, 21 pages.
Office Action issued in U.S. Appl. No. 10/938,118, mailed Oct. 24, 2012, 48 pages.
Office Action issued in U.S. Appl. No. 11/486,397, mailed Feb. 2, 2012, 14 pages.
Examiner's Report for Canadian Patent Application No. 2,443,454, mailed Jul. 24, 2012, 6 pgs.

* cited by examiner

WORKFLOW DATA BINDING

CROSS-REFERENCE TO RELATED APPLICATION(S)

This patent application is a continuation of U.S. patent application Ser. No. 11/747,888 filed May 11, 2007, entitled "Workflow Data Binding", which claims the benefit of commonly owned U.S. Provisional Patent Application Ser. No. 60/800,056, filed on May 12, 2006, entitled "Data Binding For Workflow," which is incorporated herein in its entirety by reference. This patent application also incorporates by reference the following commonly owned patent applications: U.S. Provisional Patent Application Ser. No. 60/532,776, filed Dec. 24, 2003, Canadian Patent Application No. 2,443,454, entitled "Data Binding Method in Workflow System," filed Sep. 11, 2003, and U.S. patent application Ser. No. 10/938,118, entitled "User-Friendly Data Binding, Such As Drag-And-Drop Data Binding In A Workflow Application," filed on Sep. 10, 2004.

BACKGROUND

In the context of applications software development, the practice of data binding addresses the common need for an application to access data stored in an independent data source. Generally, data binding involves retrieving data from a data source and subsequently facilitating the use of the retrieved data. In a more specific example, data binding allows a mapping from data (e.g., XML (Extensible Markup Language) data or database data) to a class or other programming structure associated with the application (e.g., a Person class, a Product class, a Meeting class, etc.). In another example, data binding may be used to retrieve data for use in setting up a software component, such as a "web control" (e.g., list box, drop-down list, etc.) that encapsulates a user interface and other related functionality. After the programmer specifies the data source to be bound (e.g., a data set containing a list of names), a data binding method or function is called, which fills the control with the data (e.g., the names from the list).

Because it provides access to external data, data binding is considered a useful technique. In addition, it also provides some level of protection and integrity for the body of data being accessed. However, traditional data binding techniques have proven awkward and difficult for programmers to control and implement.

Improvements in data binding techniques continue to be made based on specially configured application programming interfaces (APIs) and other tools. Despite these improvements, data binding still proves to be a bottleneck for more rapid application development, especially for beginner programmers who are not comfortable writing the script or code needed to implement data binding.

In a workflow application, "forms" can be used to collect or provide information. So that software developers do not need to write extensive code to provide information in a form or collect user input from a form, the software developers can employ data binding techniques to connect data sources (in the form of XML files or objects) to a workflow form. However, current programming environments (e.g., Microsoft Visual Studio 2005® or Microsoft .NET® 2.0 do not provide methods to permit direct binding of data objects to Microsoft Windows® forms or web forms.

Figure 1:
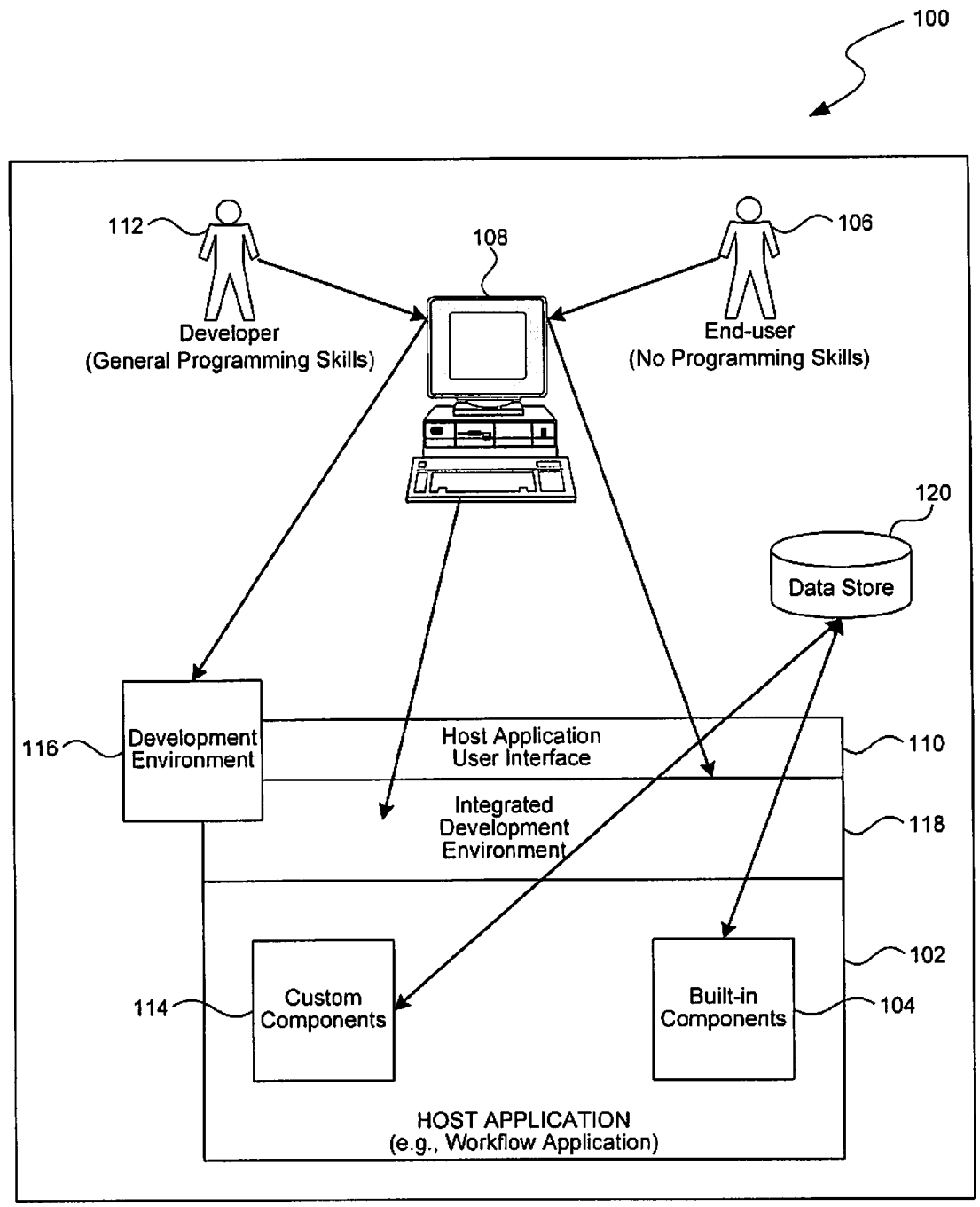
FIG. 1 is a block diagram showing an example of an environment for creating and using custom components under one embodiment of the workflow data binding system.

The headings provided herein are for convenience only and do not necessarily affect the scope or meaning of the claimed workflow data binding system.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

A portion of this disclosure contains material to which a claim for copyright is made. The copyright owner has no objection to the facsimile reproduction by anyone of the patent document or patent disclosure (including Figures), as it appears in the Patent and Trademark Office patent file or records, but reserves all other copyright rights whatsoever.

DETAILED DESCRIPTION

The workflow data binding system will now be described with respect to various embodiments. The following description provides specific details for a thorough understanding of, and enabling description for, these embodiments of the workflow data binding system. However, one skilled in the art will understand that the workflow data binding system may be practiced without these details. In other instances, well-known structures and functions have not been shown or described in detail to avoid unnecessarily obscuring the description of the embodiments of the workflow data binding system.

It is intended that the terminology used in the description presented be interpreted in its broadest reasonable manner, even though it is being used in conjunction with a detailed description of certain specific embodiments of the workflow data binding system. Certain terms may even be emphasized below; however, any terminology intended to be interpreted in any restricted manner will be overtly and specifically defined as such in this Detailed Description section.

I. Overview

A workflow data binding system provides a graphical framework that enables a user with limited programming skills to implement data binding that associates various types of data from data resources (e.g., databases and XML data resources) with specified components and/or features of a software application (e.g., user interface components such as web controls).

In some embodiments, the workflow data binding system exposes aspects of workflow XML documents in a programming environment to facilitate rapid development of workflow applications and provides adapter classes to retrieve data from a workflow database and expose the retrieved data to a development environment. As an example, the workflow data binding system exposes aspects of workflow XML documents in a Microsoft .NET 2.0 environment within a workflow application and provides adapter classes that retrieve data from a Captaris® workflow database and expose the retrieved data in a manner that is common to Microsoft® data classes or data adapters that are employed by software developers using programming languages that are employed with Microsoft Visual Studio®.

The workflow data binding system may not need to define programming control objects and bind data to the exposed properties. Thus, the workflow data binding system may not need to specify a property specifically to achieve data binding for each control that is created or provide a dynamic link library that is logically accessed through an object tree abstraction layer (e.g., associated with conventional data access frameworks) to access workflow data.

The workflow data binding system can add data binding to any program control or workflow object without requiring specific data properties to be defined for each control or access via a programming environment's object tree abstraction layer. The workflow data binding can employ a document type definition (DTD) of the XML workflow description in a form that is Microsoft .NET 2.0 compatible.

The workflow data binding system enables rapid design of workflow applications. The workflow application developer can use the visual programming environment (e.g., Microsoft Visual Studio®) to drag a data object onto a design surface to achieve a data binding that associates a data object with the workflow application. For example, a workflow application may contain a form with data entry fields on the screen, and the operation can create a data binding that associates a data entry in a form field with data from a file or database table. Once the application developer completes this operation, the object is thereafter bound to the underlying workflow data and the data binding is persistently associated with the workflow object. The binding method permits developers to drag the data binding onto a workflow object and thereafter directly employ associated objects to interact with workflow databases and documents. The workflow data binding system thus improves the visual programming environment for the creation of workflow applications.

In some embodiments, the workflow data binding system may not bind data or objects with an environment's abstraction layer. Thus, for example a dynamic link library may not need to be created for each workflow application to bind the workflow application with workflow data.

In some embodiments, data bindings are "N-tier" meaning that multiple data bindings may be placed on an workflow object, nested in its description and expressed in the XML description. The data bindings may be rapidly identified in the workflow design environment, and may be visually inspected using the visual environment, by means of a pop-up view added to the workflow object on which the data object is dropped, by scrolling through the object tree, or by inspection of the workflow objects' XML file.

Business rules and workflow code may be formed using local data binding to permit rapid processing and eliminate the delays incumbent with and potential synchronization errors associated with binding to remote data sources.

A specific implementation will now be described, though alternate implementations are also possible. The workflow data binding system can store workflow data as metadata associated with a document or task. As an example, the metadata associated with an expense report can include item descriptions (e.g., transportation), amounts (e.g., $45), and so forth. Workflow applications can make decisions based on this metadata. As an example, a workflow application may determine that an expense report with a total exceeding $1000 should be approved by a different manager than an expense report with a lower total. When a user employs a workflow package in a development environment (e.g., Microsoft Visual Studio®) to create a project, the development environment may start an editor. The workflow application developer (e.g., software developer) can model a workflow by visually associating boxes and can specify metadata, such as by specifying XML. The metadata can be associated with the boxes or connectors between the boxes. When the developer enables data binding, a code generator can generate classes that are compatible with the development environment's data binding architecture. The classes are associated with objects that transform the XML such that data binding can occur. As an example, the code generator can dynamically generate objects based on the defined XML. When the workflow application developer modifies the XML, the workflow data binding system can re-generate the objects. Thus, in some embodiments, the workflow data binding system transforms XML data into objects that can be employed with a programming environment and workflow engine.

In some embodiments, the workflow data binding system provides drag-and-drop data binding functionality for ease of use. For example, the drag-and-drop data binding functionality may allow a designer or programmer to bind an XML data object, database element, or other data resource to a software component or feature of a software component without using standard programming techniques (e.g., without writing code or script).

Once the data resource and software component or feature of the software component are bound together, the workflow data binding system may load variables associated with the data resource into the software component or feature of the software component when an end user subsequently accesses the software component. In addition, the workflow data binding system may allow changes or modifications relating to the bound data to be incorporated back into the data resource once the end user terminates the access of the software component.

In some embodiments, drag-and-drop data binding is performed in the context of a software application (e.g., workflow application) having an integrated development environment, or similar environment, thereby allowing the designer to create custom functionality for subsequent use by end users.

Upon request of the designer, the software application displays a design layer (e.g., design view) of a software component (e.g., form or web form). The designer may select one or more controls or other user interface features to associate with the software component. For example, the control may be a label, button, textbox, checkbox, radio button, combo box, list box, or any other feature configured to display and/or collect data from a user.

The software application may also display a data resource selected by the designer (e.g., an XML data object or a database data object) to reveal the data resource's elements and/or nodes. In some embodiments, the data resource's elements and/or nodes may be displayed hierarchically in a tree view or as a list.

After exposing the data resource, the designer drags and drops one or more of the data resource's elements and/or nodes onto the control or other feature associated with the software component. In some embodiments, once the data resource's element or node is dragged and dropped onto the control or other feature, an icon may appear that indicates the control or other feature is bound to the data resource. While dragging and dropping is described herein as the primary user input technique for data binding, one skilled in the art would recognize that other user-friendly input techniques could be used without departing from the scope of the workflow data binding system, such as "click-and-click," techniques involving double clicking, techniques involving the use of shortcut keys on a keyboard, techniques involving a touch sensitive display, techniques involving voice commands, etc.

Such actions by the designer result in the software application automatically generating the appropriate script or code used to implement the data-bound component for future use. In some embodiments, the workflow data binding system provides a script view so that the designer can view or alter the automatically generated script. Likewise, the workflow data binding system may provide property information relating to the control or other feature to help the designer check the success of the drag-and-drop data binding. For example, the property information may include information such as the name of the data resource and the path and name of the element or node. From a related property information view, the designer may update, change, or modify the data binding as needed. The designer may also delete the data binding.

According to these techniques, a designer can quickly create and populate software components such as forms or web forms. In addition, the workflow data binding system may allow the designer to create shortcuts for future development. For example, the designer may select a data resource and invoke a shortcut so that the workflow data binding system automatically creates a bound control or feature for selected elements (or all the elements) in the data resource.

II. Representative Computing Environment

FIG. 1 and the following discussion provide a brief, general description of a suitable environment in which the workflow data binding system can be implemented. Although not required, aspects of the workflow data binding system are described in the general context of computer-executable instructions, such as routines executed by a general-purpose computer (e.g., a server computer, wireless device, or personal/laptop computer). Those skilled in the relevant art will appreciate that the workflow data binding system can be practiced with other communications, data processing, or computer system configurations, including Internet appliances, hand-held devices (including personal digital assistants (PDAs)), wearable computers, all manner of cellular or mobile phones, embedded computers (including those coupled to vehicles), multi-processor systems, microprocessor-based or programmable consumer electronics, set-top boxes, network PCs, minicomputers, mainframe computers, and the like.

Aspects of the workflow data binding system can be embodied in a special purpose computer or data processor that is specifically programmed, configured, or constructed to perform one or more of the computer-executable instructions explained in detail herein. Aspects of the workflow data binding system can also be practiced in distributed computing environments where tasks or modules are performed by remote processing devices, which are linked through a communication network. In a distributed computing environment, program modules may be located in both local and remote memory storage devices.

Aspects of the workflow data binding system may be stored or distributed on computer-readable media, including magnetically or optically readable computer disks, as microcode on semiconductor memory, nanotechnology memory, organic or optical memory, or other portable data storage media. Indeed, computer-implemented instructions, data structures, screen displays, and other data under aspects of the workflow data binding system may be distributed over the Internet or over other networks (including wireless networks), may be distributed on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the workflow data binding system reside on a server computer, while corresponding portions reside on a client computer, such as a mobile device.

Referring to FIG. 1, a typical environment 100 in which the workflow data binding system operates includes a host application 102. For illustrative purposes, the host application 102 in the illustrated embodiment is a workflow application, but the workflow data binding system may be implemented in the context of almost any type of applications software (drawing software, data organization software, web design software, etc.). The host application 102 in the illustrated embodiment provides a set of "built-in" or default components 104 (e.g., workflow objects, data objects, resource objects, actions, etc.). Examples of such built-in components are web forms and forms, which are illustrated and described with respect to FIGS. 3 and 4, respectively. An end user 106 accesses the host application 102 via a computer 108, which displays an application interface 110 on a screen or other output device. In addition to a display screen, the computer 108 may provide a variety of input/output features, such as a touch-sensitive screen, a mouse or joystick, directional controls, speakers, a keyboard, voice-activated controls, etc.

The host application 102 is configured so that a developer 112 can enhance its functionality by designing one or more custom components 114 via a development environment 116 (e.g., Microsoft Visual Studio .NET) that provides some integration with the host application through an integrated development environment 118. Once the developer 112 creates such custom components 114 and integrates them into the host application 102, the end user 106 may access the custom components 114 via the computer 108 and application interface 110, as he or she would access the built-in components 104.

In addition, the developer may perform data binding techniques associated with both the built-in 104 and custom 114 components. A data store 120 stores data used in data binding associated with the components (104 and 114) of the host application 102. For example, the data store 120 may be a relational or multidimensional database. The data store 120 may also (or alternatively) store XML data or other types of data.

III. Sample User Interface

Referring to FIGS. 2 through 8, representative computer displays or web pages will now be described from the context of a user interacting with various screens or pages. The screens of FIGS. 2 through 8 may be implemented in C# or as web pages under XML (Extensible Markup Language), HTML (HyperText Markup Language), or any other scripts or methods of creating displayable data, such as the Wireless Access Protocol ("WAP"). The screens or web pages provide facilities to receive input data, such as a form with fields to be filled in, pull-down menus or entries allowing one or more of several options to be selected, buttons, sliders, hypertext links, or other known user interface tools for receiving user input. While certain ways of displaying information to users are shown and described with respect to certain Figures, those skilled in the relevant art will recognize that various other alternatives may be employed. The terms "screen," "web page," and "page" are generally used interchangeably herein.

When implemented as web pages, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the workflow data binding system are described herein using a networked environment, some or all features may be implemented within a single-computer environment.

FIGS. 2 through 8 show sample screens from a workflow application, which is used here as an example of the host application 102 of FIG. 1. The workflow application of this illustrated embodiment permits users to define and track business processes, such as the flow of work between individuals and/or groups in, for example, an organization or industry. Many of the sample screens illustrated below correspond with aspects of an integrated development environment associated with the workflow application, such as the integrated development environment 118 of FIG. 1.

Figure 2A:
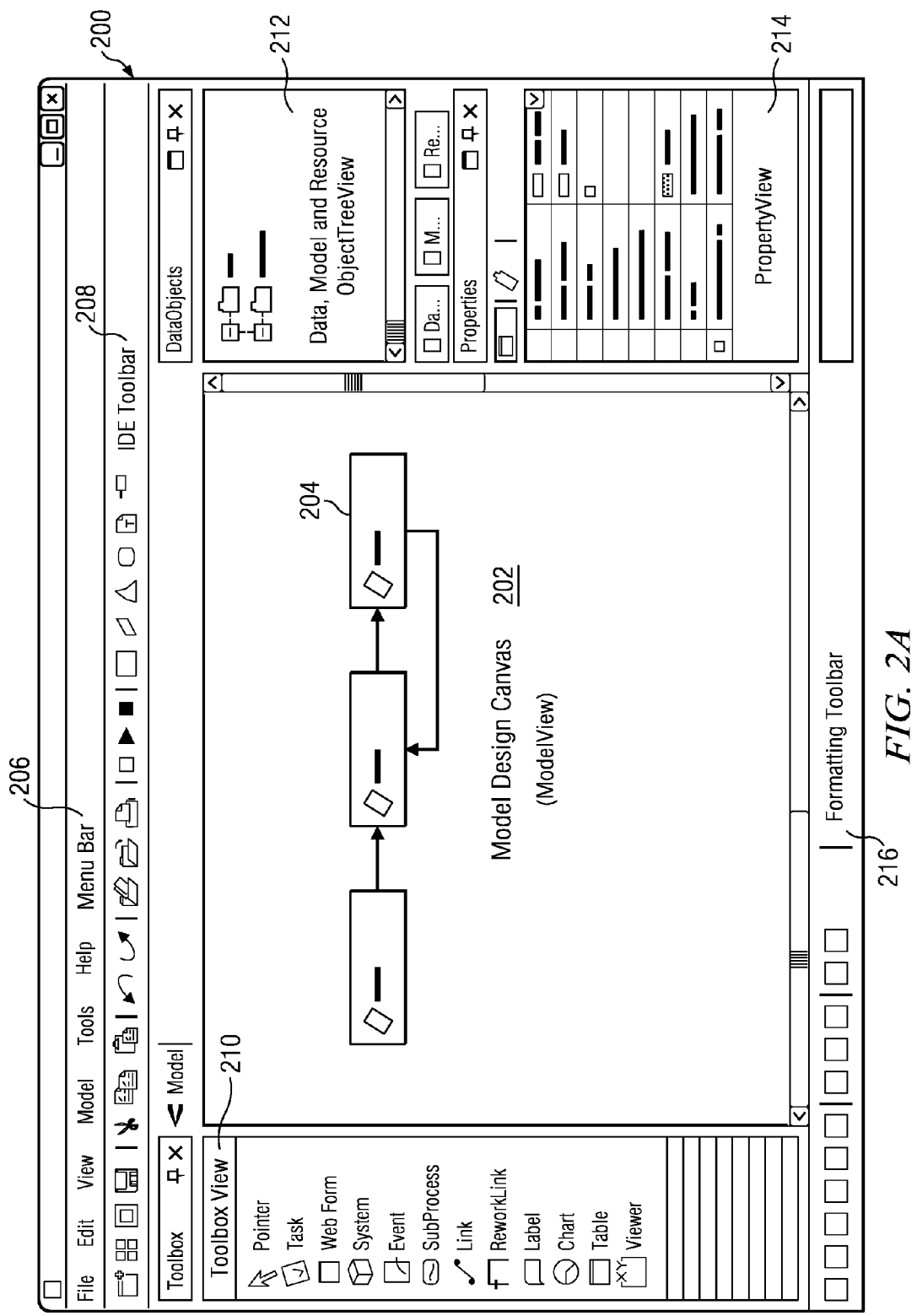
FIG. 2A is a display diagram showing a design view in the integrated development environment of FIG. 1.

Referring to FIG. 2A, a model view 200 of the workflow application includes a design view 202 (e.g., model design canvas) that provides a workspace where a user can design a high-level workflow model using custom or built-in workflow components (e.g., workflow objects, data objects, resource objects, actions, etc.). For example, the user can arrange workflow objects, such as tasks 204, in the design view 202 to build a business process. In the illustrated embodiment, the model view 200 also includes a menu bar 206, an integrated development environment toolbar 208, a toolbox view 210, an object tree view 212, a property view 214, and a formatting toolbar 216.

In the illustrated embodiment, the toolbox view 210 is part of the integrated development environment and contains four panels containing various forms, objects, utilities, and wizards used in designing a workflow model. The toolbox view 210 may have one or more tabs, such as a workflow tab, a form tab, a web form tab, and an actions tab. Clicking on one of these tabs may display a corresponding specialized toolbox. Alternatively, the appropriate specialized toolbox may be displayed automatically, depending on the user's activities. For example, if a user is working on a form in the design view 202, the form toolbox may be automatically displayed.

Figure 2B:
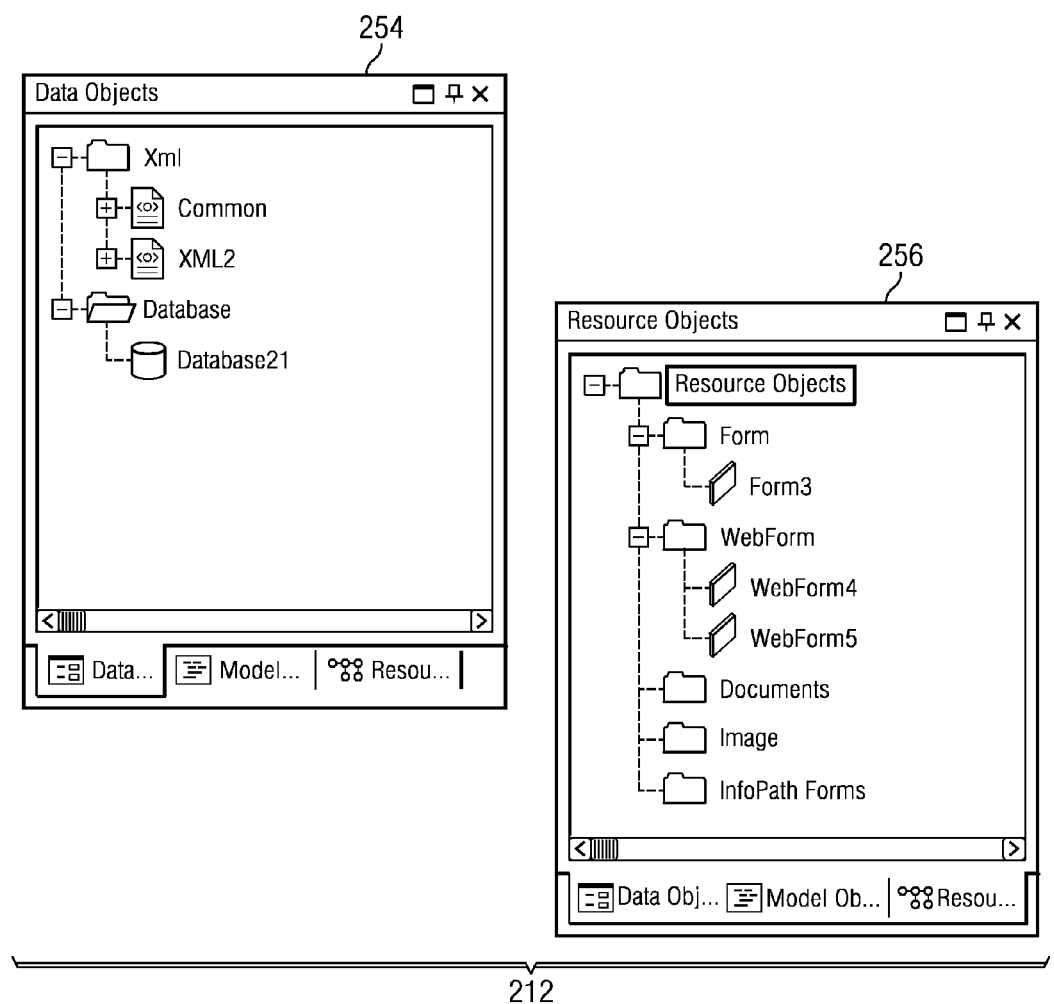
FIG. 2B is a display diagram showing an object tree view in the integrated development environment of FIG. 1.

FIG. 2B is a display diagram showing an object tree view 212 in the integrated development environment of FIG. 1. In some embodiments, the object tree view 212 is displayed by default when the integrated development environment is displayed.

The object tree view 212 provides access to resources (including data resources) within a workflow model that a designer is currently working on. As shown in FIG. 2B, the object tree view 212 of the illustrated embodiment is represented by a folder structure similar to Microsoft's Windows Explorer. For example, the folder structure may show the various components of the workflow model. Such components may include workflow objects, data objects, resource objects, actions, etc. In some embodiments, the object tree view 212 shows each different component type in a separate view. A data object view 254 and a resource object view 256 are displayed in FIG. 2B. When a hierarchical folder structure is used, the designer can access child elements and nodes of the folder view by clicking on the "+" expand nodes for each folder.

Figure 3:
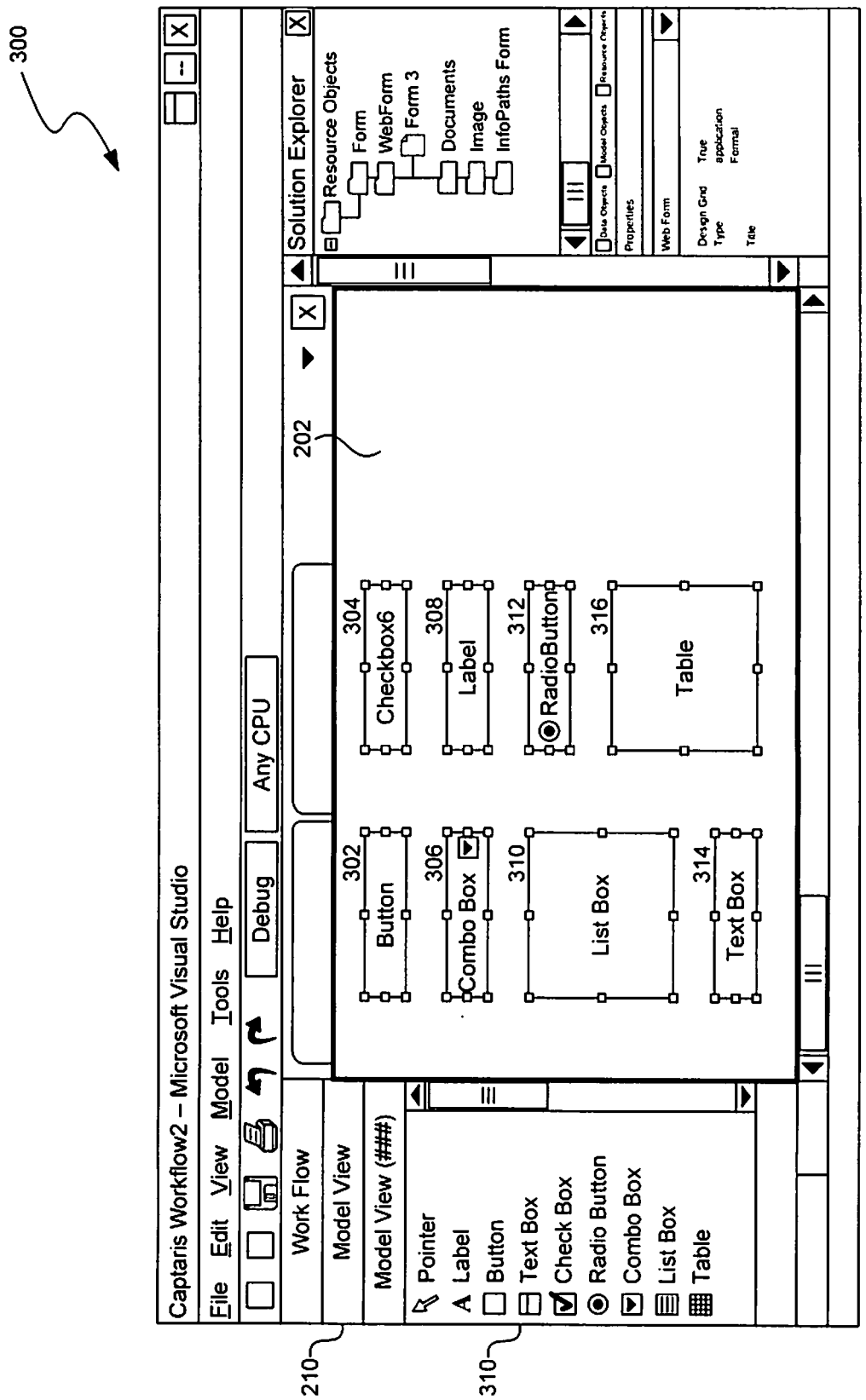
FIG. 3 is a display diagram showing an unbound web form and associated controls.

FIG. 3 is a display diagram showing an unbound web form 300 and associated controls. In the context of the workflow application of the illustrated embodiment, the web form 300 is generally used when the designer knows that the primary user interface for gathering and viewing data is a web browser. For example, the designer may create one or more web forms for each task in a workflow model. In general, web forms are platform independent and users with a compatible web browser can access the web forms regardless of their computer's operating system. Typically, the web form 300 displays a simple user interface and is highly suitable for text-intensive applications.

The designer may create the web form 300 from the design view 202 of the workflow application. The designer places and configures controls (such as Microsoft ASP .NET controls) or other features/user interface components into the web form. Such controls may include buttons 302, check-boxes 304, combo boxes 306, labels 308, list boxes 310, radio buttons 312, text boxes 314, tables 316, etc. In some embodiments, the designer can add additional functionality to the web form 300 and its controls by writing script or other code in a script view (not shown).

When the designer is creating a web form or when an existing web form is displayed in the integrated development environment, the toolbox view 210 may automatically display a web form tab from which the designer can select all the available controls or features that can be added to the web form using drag-and-drop functionality. Once a control or other feature is dropped onto the web form 300, the workflow application automatically generates script or code (not shown) for the web form 300. In some embodiments, the designer can view and customize the created script or code in a script view (not shown).

Figure 4:
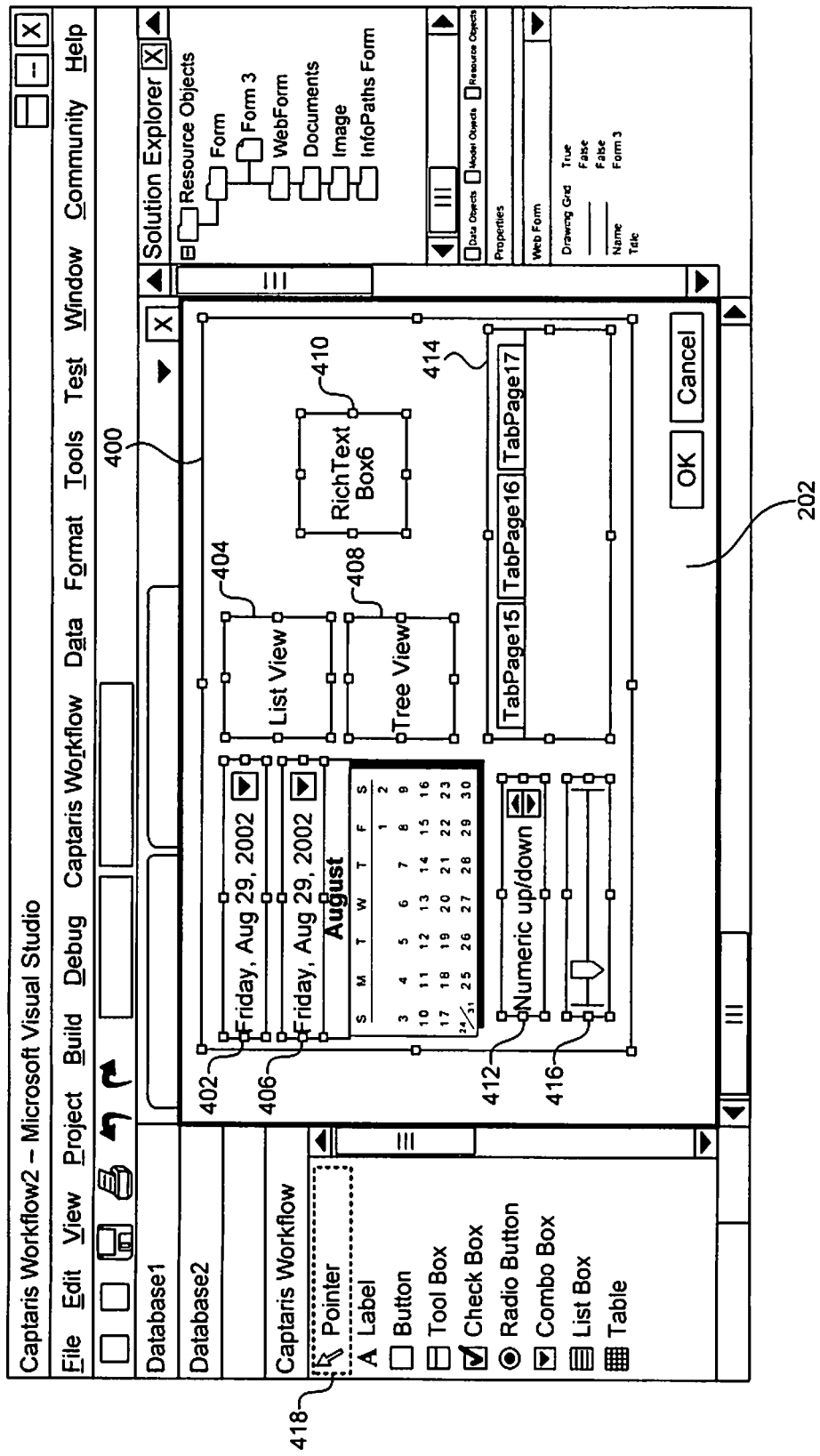
FIG. 4 is a display diagram showing an unbound form and associated controls.

Referring to FIG. 4, the designer may select to use a form 400 instead of a web form when the designer knows that an end user will input or view data in a Microsoft Windows environment, such as a Windows client. Typically, the form 400 can display a simple or complex user interface, depending on the types of controls or features used and any added functionality.

In the illustrated embodiment, the controls or features available for use with the form 400 include all the controls (302, 304, 306, 308, 310, 312, 314, and 316) of the web form 300 of FIG. 3 in addition to any of the following: date 402, list view 404, month calendar 406, tree view 408, rich text box 410, numeric up/down 412, tab 414, tracker bar 416, etc.

Like the web form 300, the form 400 can include any number of offered controls, and the designer may add extra script that can perform functions such as calling another form, accessing a database, sending an email, assembling a document, etc. As with the web form 300, the designer creates the form 400 by placing and configuring the offered controls in the design view 202. When a new form is created or an existing form is displayed, the workflow application automatically displays a form tab 418 from which all the available controls or other features can be added to the form, using, for example, drag-and-drop functionality. Each time a new control or feature is added to the form 400, the workflow application automatically generates script for the form, which can be viewed and/or customized from the script view.

Figure 7:
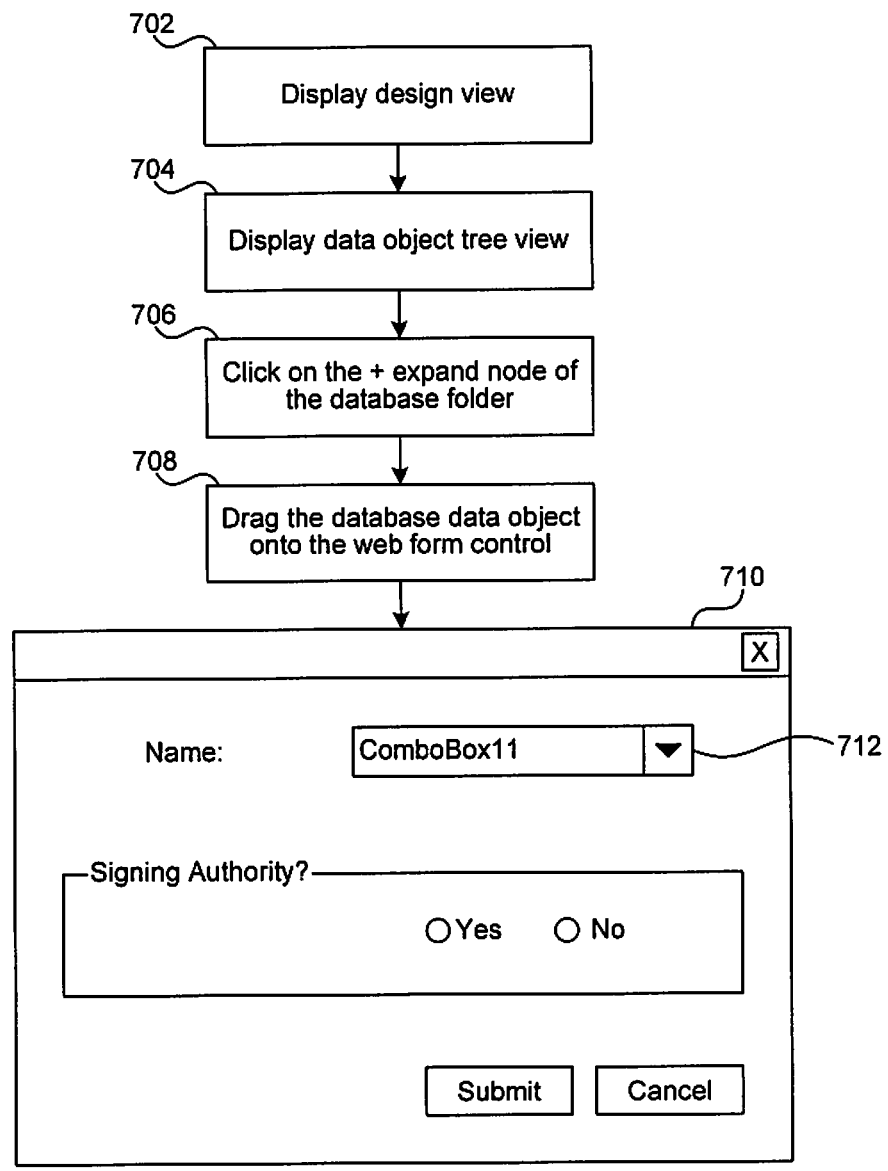
FIG. 7 is a display diagram showing data binding performed by dragging and dropping database data onto a web form.
Figure 8:
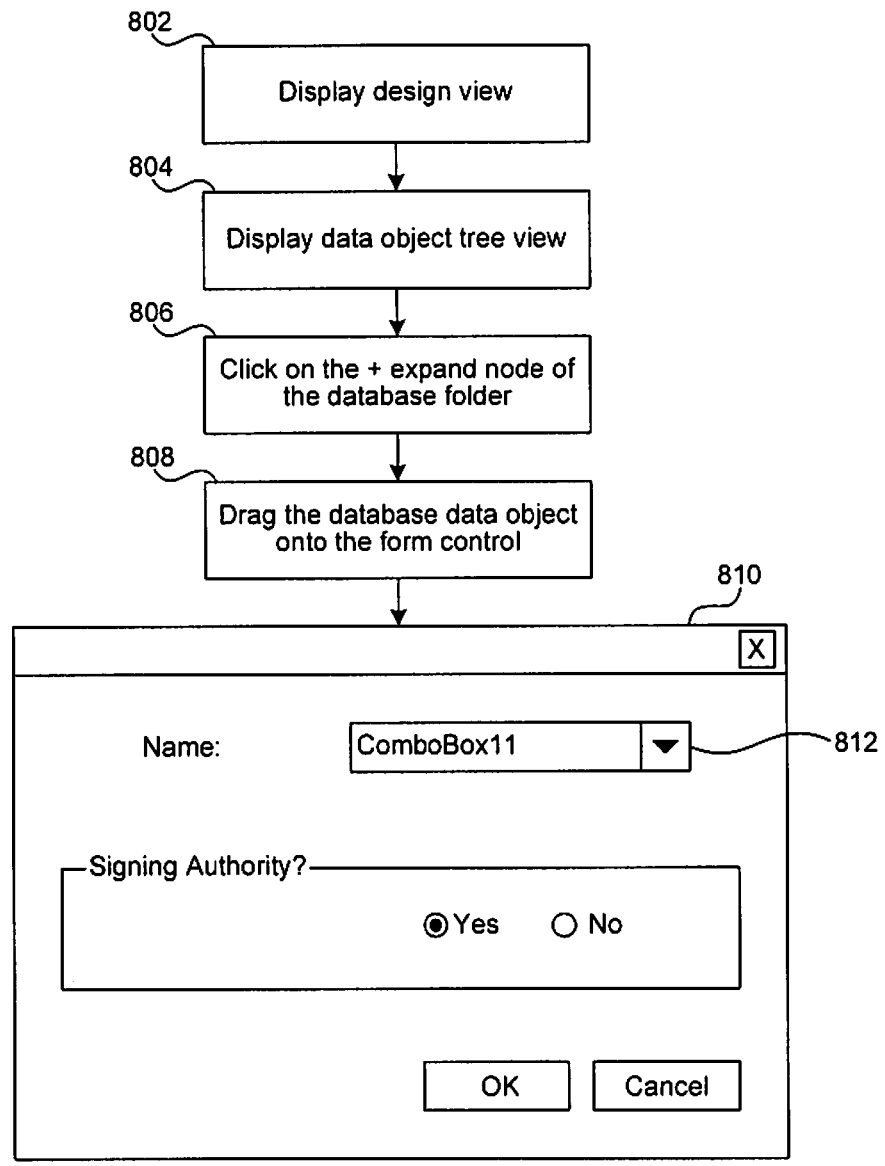
FIG. 8 is a display diagram showing data binding performed by dragging and dropping database data onto a form.

In the illustrated embodiment, there are various types of data objects available for use in the workflow application. These include XML data objects (FIGS. 5 and 6) and database data objects (FIGS. 7 and 8).

Figure 5:
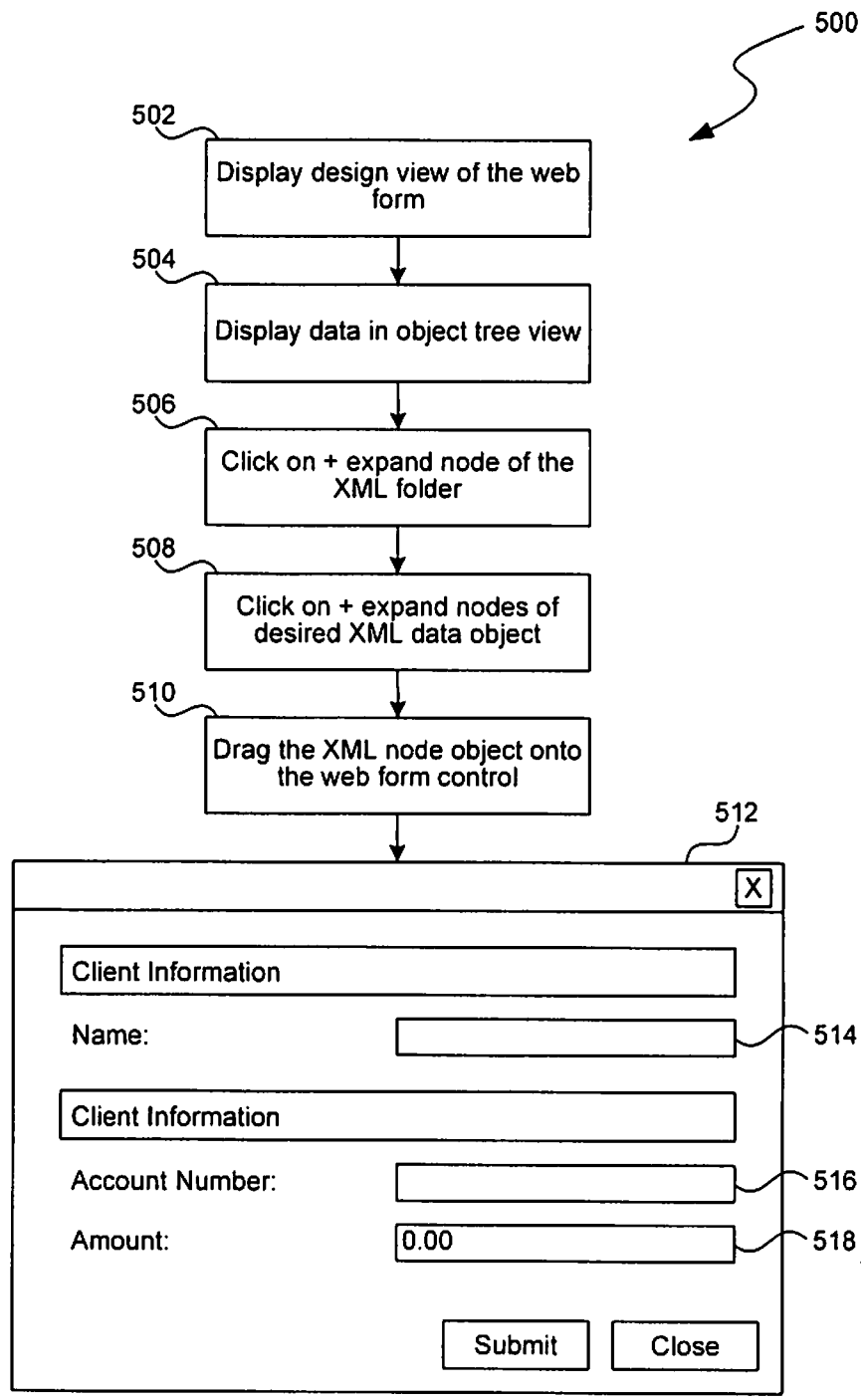
FIG. 5 is a display diagram showing data binding performed by dragging and dropping XML data onto a web form.
Figure 6:
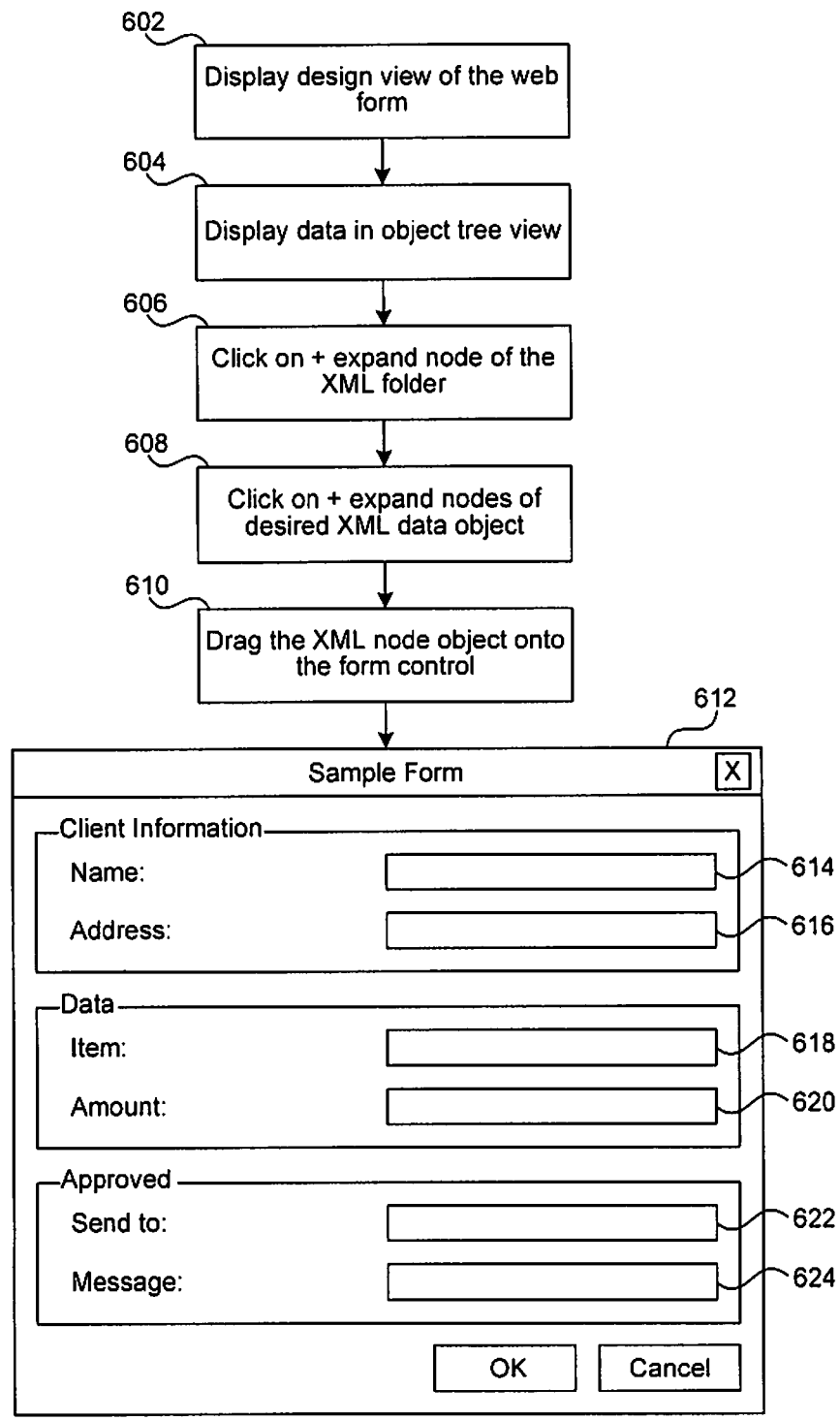
FIG. 6 is a display diagram showing data binding performed by dragging and dropping XML data onto a form.

Referring to FIGS. 5 and 6, XML data objects are typically used to hold data captured during the execution of a process. For example, during the execution of a workflow model application, there may be a number of data items that are used during execution but that are not stored in a database. XML data objects are ideal for this type of data. The XML files can be imported from and exported to a file system for more permanent data storage after a process has finished executing. The workflow application of the illustrated embodiment provides a very simple interface for working with XML data objects that does not require previous knowledge of XML file formats.

Accordingly, contents of XML files may be made available from any task within the workflow model, making the task an ideal data depository for the duration of the workflow model's execution. There may be multiple XML data objects associated with a single workflow model.

Drag-and-drop XML data binding provides a quick and easy way of binding data from the nodes of an XML data object to the controls in a web form (FIG. 5) or form (FIG. 6). By binding controls of a web form or form to corresponding elements or nodes in an XML data object, the appropriate XML variables are loaded to the controls in the web form or form. At the closing of the web form or form, property controls associated with the data as it resides in the web form or form are then loaded to the XML variables of the data source.

Referring to FIG. 5, drag-and-drop data binding is performed in the workflow application using primarily the design view 202. Upon request of the designer, the workflow application displays a web form 502 and exposes XML data objects in the object tree view 504. The designer clicks on the "+" expand node of the XML folder in the object tree view 506 to reveal the XML data structure. The designer clicks on the "+" expand node of the XML data object in the object tree view 508 to reveal the XML data object's elements and/or nodes in a hierarchical structure. The designer drags and drops a selected XML data element or nodes onto a control or other feature associated with the component 510. For example, the control may be a label, button, textbox, checkbox, data, radio button, combo box, list box, etc. As shown in block 512, the designer has dropped an XML data element or node onto a name list box 514, an account list box 516, and an amount list box 518 of the web form. Such actions by the designer result in the workflow application automatically generating the appropriate script or code used to implement the data-bound web form for future use by an end user. In this way, information entered into the web form by an end user can be populated back to an XML data store when the web form is closed.

Once the XML data element or node is dropped on the control or other feature, an XML icon may appear that indicates the control is bound to the XML data object. In some embodiments, a tool tip associated with the icon identifies the exact node or element that is bound to the control.

In some embodiments, a property of the control or other feature may be available from the property view 214 to help the designer check the success of the XML data binding. For example, the property may provide information such as the name of the data object and the path and name of the element or node. From the property view 214, the designer may update, change, or modify the XML data binding as needed. The designer may also delete the XML data binding. The designer can unbound web form controls by clicking or deleting the reference to the XML data object and node from the XML data binding property.

FIG. 6 is a display diagram showing data binding performed by dragging and dropping XML data to a form. The same techniques described above with respect to FIG. 5 (for binding XML data to a web form) are used for a form. The drag-and-drop data binding is performed in the workflow application using primarily the design view 202. Upon request of the designer, the workflow application displays a form 602 and exposes XML data objects in the object tree view 604. The designer clicks on the "+" expand node of the XML folder in the object tree view 606 to reveal the XML data structure. The designer clicks on the "+" expand node of the XML data object in the object tree view 608 to reveal the XML data object's elements and/or nodes in a hierarchical structure. The designer drags and drops a selected XML data element or node onto a control or other feature associated with the component 610. For example, the control may be a monthly calendar, a label, button, textbox, checkbox, data, radio button, combo box, list box, etc. As shown in block 612, the designer has dropped an XML data element or node onto a name text box 614, an address text box 616, an item text box 618, an amount text box 620, a send to text box 622 and a message text box 624 of the form. Such actions by the designer result in the workflow application automatically generating the appropriate script or code used to implement the data-bound form for future use by an end user. In this way, information entered into the form by an end user can be populated back to an XML data store when the form is closed.

FIGS. 7 and 8 are display diagrams showing data binding performed by dragging and dropping database data into a web form and form, respectively. Database data objects generally allow a component to attach directly to existing database tables. The workflow application of the illustrated embodiment provides an easy-to-use drag-and-drop graphical interface that allows the designer to attach a database data object to a control in a web form without the designer having to possess extensive knowledge of SQL database programming.

By binding controls of a web form or form to corresponding fields in a database data object, the database variables are loaded to the controls in the web form or form. At the closing of the web form or form, property controls associated with the data object as it resides in the web form or form are then loaded to the data fields of the data source.

Referring to FIG. 7, drag-and-drop data binding is performed in the workflow application using primarily the design view 202. Upon request of the designer, the workflow application displays a web form 702 and exposes database data objects in the object tree view 704. The designer clicks on the "+" expand node of the database folder in the object tree view 706 to reveal the database's data elements. The designer drags and drops a selected database data element onto a control or other feature associated with the form 708. For example, the control may be a label, button, textbox, checkbox, radio button, combo box, list box, etc. As shown in block 710, the designer has dropped a database data element onto a name combo box 712 on the web form. Such action by the designer results in the workflow application automatically generating the appropriate script or code used to implement the data-bound web form for future use by an end user. In this way, information entered into the web form by an end user can be populated back to the database when the web form is closed.

Once the designer drops the database data element or node on the control or other feature, a database icon 714 may appear that indicates the control is bound to the database element. In some embodiments, a tool tip associated with the icon identifies the exact element that is bound to the control.

In some embodiments, a property of the control or other feature may be available from the property view 214 to help the designer check the success of the database data binding. For example, the property may provide information such as the name of the data object and the path and name of the element or node. From the property view 214, the designer may update, change, or modify the database data binding as needed. The designer may also delete the database data binding. Web form controls can be unbound by clicking or deleting the reference to the database data object and element from the database data binding property.

In some embodiments, form and web form controls can be unbound by deleting the reference to the database data object and field from the database data binding property displayed in the property view 214. Controls with database data binding can be updated by dragging and dropping another database data object onto the control or by editing the database data binding property.

FIG. 8 is a display diagram showing data binding performed by dragging and dropping database data into a form. The same techniques described above with respect to FIG. 7 (for binding database data to a web form) are used for a form. Upon request of the designer, the workflow application displays a form 802 and exposes database data objects in the object tree view 804. The designer clicks on the "+" expand node of the database folder in the object tree view 806 to reveal the database's data elements. The designer drags and drops a selected database data element onto a control or other feature associated with the form 808. For example, the control may be a label, button, textbox, checkbox, data, radio button, combo box, list box, etc. As shown in block 810, the designer has dropped a database data element onto a name combo box 812 on the form. Such action by the designer results in the workflow application automatically generating the appropriate script or code used to implement the data-bound form for future use by an end user. A database icon 814 near the combo box 812 shows that the data binding request has been completed.

IV. System Flows

Figure 9:
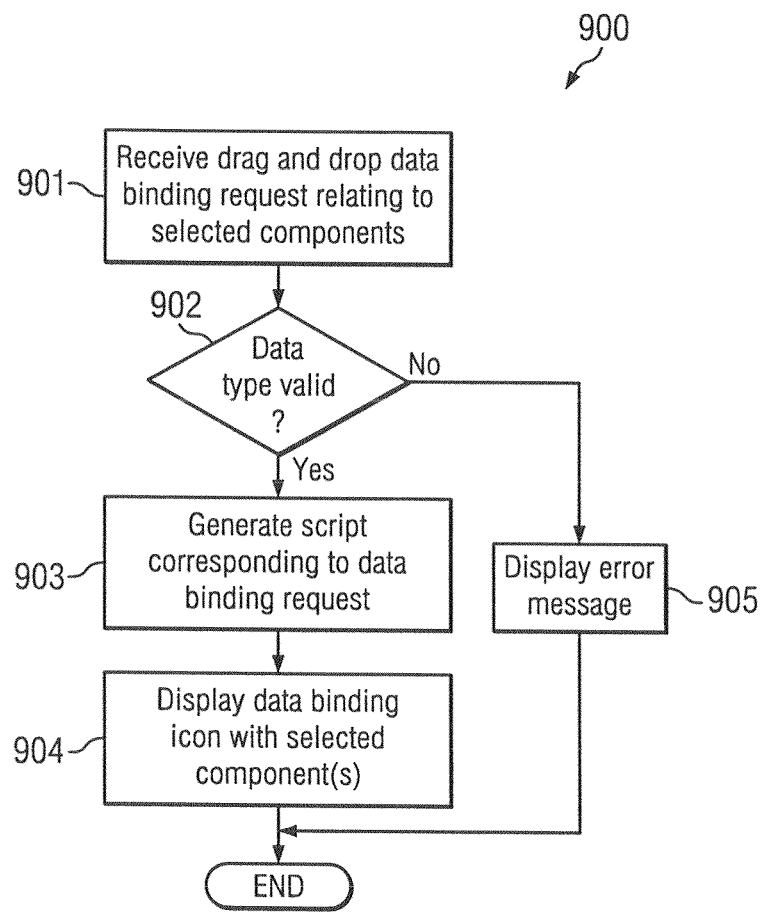
FIG. 9 is a flow diagram showing a routine for automatically generating script or code for data binding.

FIG. 9 is a representative flow diagram that shows a routine 900 for creating a script that implements data binding. This flow diagram does not show all functions or exchanges of data but, instead, provides an understanding of commands and data exchanged under the system. Those skilled in the relevant art will recognize that some functions or exchanges of commands and data may be repeated, varied, omitted, or supplemented, and other aspects not shown may be readily implemented.

At block 901 the routine 900 receives a request for data binding (e.g., a drag and drop of selected data resources onto a selected feature or component). At decision block 902 the routine 900 validates the received request. For example, the routine 900 may check that the data type being dropped onto a control conforms to that control's data structures. If at decision block 902, the data type being dropped onto to the control does not match the control's data structures, the routine 900 continues at block 905, where an error message is displayed before the routine ends. If, however, at decision block 902, the data type being dropped onto the control matches the control's data structure (i.e., the validation is successful), the routine 900 continues at block 903, where the routine automatically generates a script to implement the data binding request. At block 904, the routine 900 displays an icon on or near the feature or component, indicating the data binding has been successfully completed. The routine 900 then ends.

Figure 10:
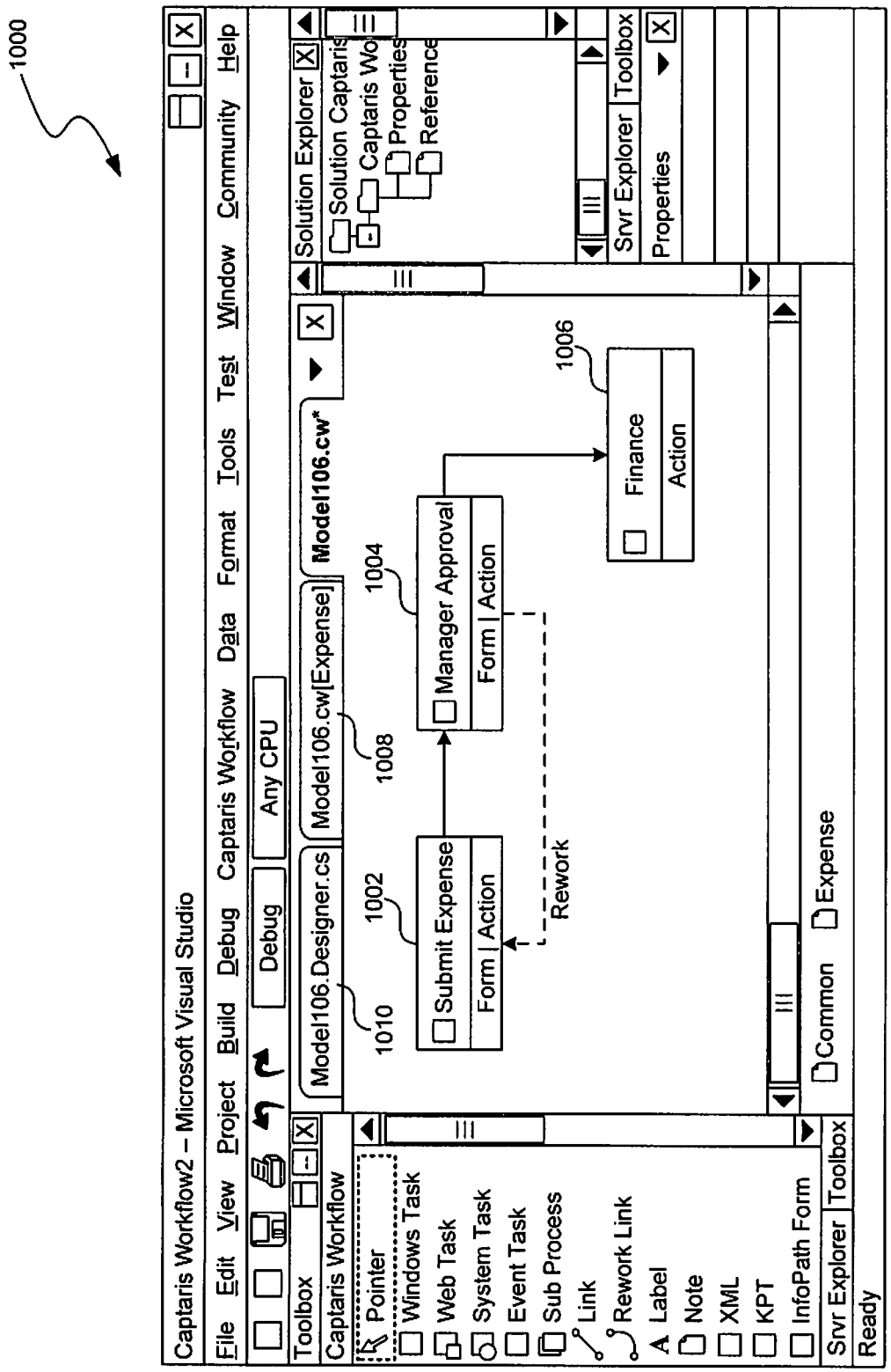
FIG. 10 is a display diagram showing a design view of the integrated development environment.

FIG. 10 is a display diagram showing a design view of the integrated development environment. The display diagram 1000 illustrates a workflow with boxes Submit Expense 1002, Manager Approval 1004, and Finance 1006. The Submit Expense box can be associated with an XML fragment describing an expense as follows:

```
<Expense>
    <Description type="string" />
    <Amount type="decimal" />
    <Approved type="boolean" />
</Expense>
```

The workflow application developer can view and manipulate this XML in the development environment, such as by selecting tab 1008. The workflow data binding system can employ this XML to create an object that is suitable for data binding. It may generate the following class definition, which the developer can view by selecting tab 1010.

```
public IProcess Model;
[NonSerialized( )]
public IModelEmail Email;
[NonSerialized( )]
public IModelDocAssemlber DocAssembler;
[NonSerialized( )]
public IModelLink Link11;
[NonSerialized( )]
public IModelTask Task9;
[NonSerialized( )]
```

```
            public IModelLabel Label8;
            [NonSerialized( )]
            public IModelLink Rework7;
            [NonSerialized( )]
            public IModelLink Link6;
            [NonSerialized( )]
            public IModelTask Task5;
            [NonSerialized( )]
            public IModelTask Submit;
            [NonSerialized( )]
            public IModelXML Expense;
            [NonSerialized( )]
            public IModelXML Common;
            #region ISerializable Members
            public Model106( ) { }
            protected Model106(System.Runtime.Serialization.SerializationInfo info, System.Runtime.Serialization.StreamingContext context)
            {
                if (info == null)
                    throw new System.ArgumentNullException("info");
                System.Reflection.BindingFlags flags = System.Reflection.BindingFlags.Instance | System.Reflection.BindingFlags.DeclaredOnly | System.Reflection.BindingFlags.NonPublic | System.Reflection.BindingFlags.Public;
                System.Reflection.FieldInfo[ ] fields = GetType( ).GetFields(flags);
                foreach (System.Reflection.FieldInfo field in fields)
                {
                    if (field.IsNotSerialized)
                        continue;
                    try
                    {
                        object value = info.GetValue(field.Name, field.FieldType);
                        field.SetValue(this, value, flags, null, System.Globalization.CultureInfo.CurrentCulture);
                    }
                    catch (System.Runtime.Serialization.SerializationException)
                    {
                        //the field is new, a default value will be assigned
                    }
                }
            }
            public void GetObjectData(System.Runtime.Serialization.SerializationInfo info, System.Runtime.Serialization.StreamingContext context)
            {
                if (info == null)
                    throw new System.ArgumentNullException("info");
                System.Reflection.BindingFlags flags = System.Reflection.BindingFlags.Instance | System.Reflection.BindingFlags.DeclaredOnly | System.Reflection.BindingFlags.NonPublic | System.Reflection.BindingFlags.Public;
                System.Reflection.FieldInfo[ ] fields = GetType( ).GetFields(flags);
                foreach (System.Reflection.FieldInfo field in fields)
                {
                    if (field.IsNotSerialized)
                        continue;
                    info.AddValue(field.Name, field.GetValue(this));
                }
            }
            #endregion
            [NonSerialized]
            private CaptarisWorkflow2.Expense_ExpenseBinding;
            public CaptarisWorkflow2.Expense ExpenseBinding
            {
                get
                {
                    if (_ExpenseBinding == null)
                        _ExpenseBinding = new CaptarisWorkflow2.Expense(Expense);
                    return _ExpenseBinding;
                }
            }
        }
    }
//------------------------------------------------------------
// <auto-generated>
//     This code was generated by a tool.
//     Runtime Version: 6.5.331.0
//
//     Changes to this file may cause incorrect behavior and will be lost if
//     the code is regenerated.
// </auto-generated>
//------------------------------------------------------------
namespace CaptarisWorkflow2
{
```

```
using System.Xml.Serialization;
using Teamplate.BLL;
public      partial      class      Expense     :      System.ComponentModel.INotifyPropertyChanged,
System.ComponentModel.IEditableObject
{
    private IModelXML _modelXml;
    private bool _inTransaction = false;
    private data_for_internal_use_only _backup;
    private data_for_internal_use_only _data;
    private struct data_for_internal_use_only
    {
        internal string Description;
        internal decimal Amount;
        internal boolean Approved;
    }
    #region constructors
    public Expense( )
    {
        _data = new data_internal_use_only( );
    }
    public Expense(IModelXML modelXml)
        : this( )
    {
        _modelXml = modelXml;
        _data.Description = _modelXml["Expense/Description"];
        decimal.TryParse(_modelXml["Expense/Amount"], out _data.Amount);
        boolean.TryParse(_modelXml["Expense/Approved"], out _data.Approved);
    }
    #endregion
    #region properties
    public string Description
    {
        get { return _data.Description; }
        set
        {
            if (_data.Description != value)
            {
                _data.Description = value;
                RaisePropertyChanged("Description");
            }
        }
    }
    public decimal Amount
    {
        get { return _data.Amount; }
        set
        {
            if (_data.Amount != value)
            {
                _data.Amount = value;
                RaisePropertyChanged("Amount");
            }
        }
    }
    public boolean Approved
    {
        get { return _data.Approved; }
        set
        {
            if (_data.Approved != value)
            {
                _data.Approved = value;
                RaisePropertyChanged("Approved");
            }
        }
    }
    #endregion
    #region methods
    public void Merge(Expense source)
    {
        _data = source._data;
    }
    public void Save( )
    {
        if (_modelXml == null)
            throw new System.NullReferenceException( );
        _modelXml["Expense/Description"] = _data.Description;
        _modelXml["Expense/Amount"] = _data.Amount.ToString( );
        _modelXml["Expense/Approved"] = _data.Approved.ToString( );
    }
```

```
            #endregion
            #region INotifyPropertyChanged
            public event System.ComponentModel.PropertyChangedEventHandler PropertyChanged;
            protected void RaisePropertyChanged(string propertyName)
            {
                System.ComponentModel.PropertyChangedEventHandler propertyChanged = this.PropertyChanged;
                if ((propertyChanged != null))
                    propertyChanged(this, new System.ComponentModel.PropertyChangedEventArgs(propertyName));
            }
            #endregion
            #region IEditableObject Members
            public void BeginEdit( )
            {
                if(!_inTransaction)
                {
                    _backup = _data;
                    _inTransaction = true;
                }
            }
            public void CancelEdit( )
            {
                if (_inTransaction)
                {
                    _data = _backup;
                    _inTransaction = false;
                }
            }
            public void EndEdit( )
            {
                if (_inTransaction)
                {
                    Save( );
                    _backup = new data_for_internal_use_only( );
                    _inTransaction = false;
                }
            }
            #endregion
        }
    }
//------------------------------------------------------------------------------
// <auto-generated>
//     This code was generated by a tool.
//     Runtime Version: 6.5.331.0
//
//     Changes to this file may cause incorrect behavior and will be lost if
//     the code is regenerated.
// </auto-generated>
//------------------------------------------------------------------------------
namespace CaptarisWorkflow2
{
    using Teamplate.BLL;
    [System.ComponentModel.DataObject]
    public class ExpenseWebGateway
    {
        private string token
        {
            get { return System.Web.HttpContext.Current.Request.QueryString["token"]; }
        }
        private int processId
        {
            get { return int.Parse(System.Web.HttpContext.Current.Request.QueryString["PID"]); }
        }
[System.ComponentModel.DataObjectMethod(System.ComponentModel.DataObjectMethodType.Update)]
        public void UpdateData(Expense data)
        {
            Expense source = SelectData( );
            source.Merge(data);
            source.Save( );
        }
[System.ComponentModel.DataObjectMethod(System.ComponentModel.DataObjectMethodType.Select)]
        public Expense SelectData( )
        {
            Expense data = null;
            using (BProcess process = new BProcess( ))
            {
                process.SetSessionToken(token);
                process.Load(processId);
```

```
            data = new Expense(process.GetXmlObject("Expense"));
        }
        return data;
    }
  }
}
```

Figure 11:
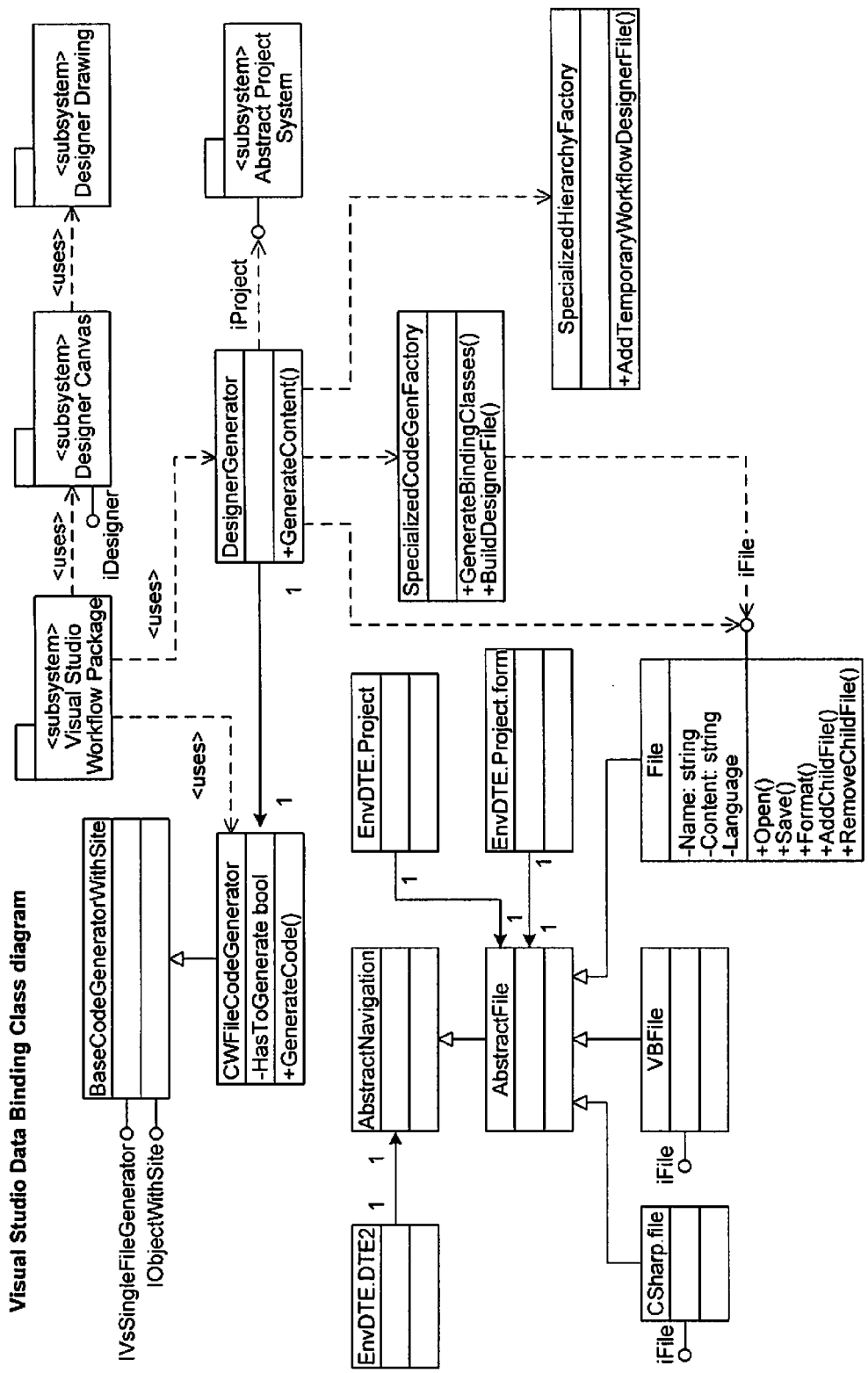
FIG. 11 is a block diagram showing class binding in the integrated development environment.

FIG. 11 is a block diagram showing class binding in the integrated development environment. The binding class diagram illustrates how various components of the integrated development environment interrelate to bind data and generate code.

Figure 12:
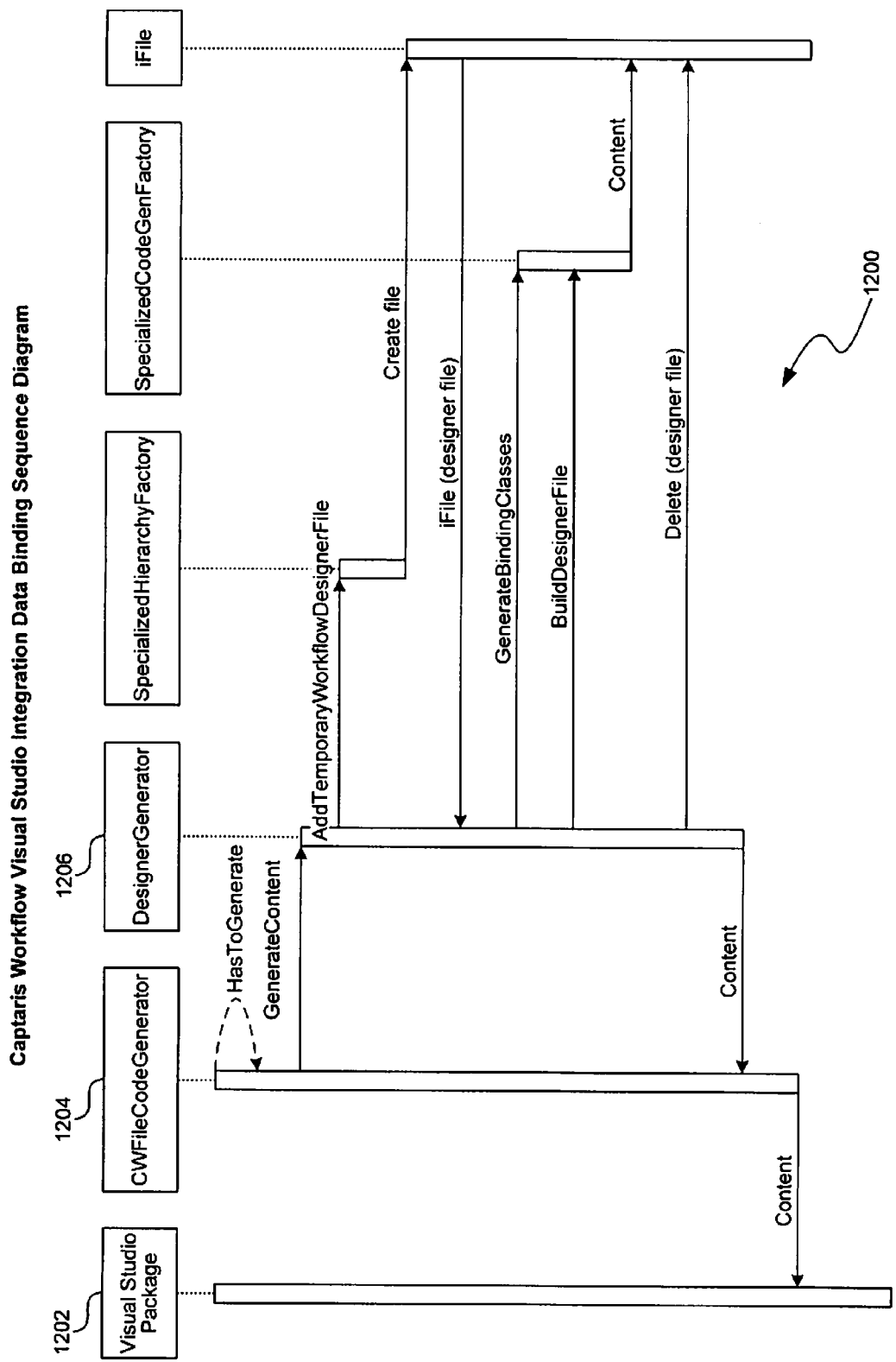
FIG. 12 is a sequence diagram showing a data binding sequence.

FIG. 12 is a sequence diagram showing a data binding sequence. The data binding sequence 1200 corresponds to the binding class diagram illustrated in FIG. 11. The package 1202 can generate code into which a code generator component 1204 can emit code. The code can be based on the contents of an XML file corresponding to the workflow. A designer generator component 1206 then generates content and binding classes for the code. The content can then be provided to the package 1202.

Figure 13:
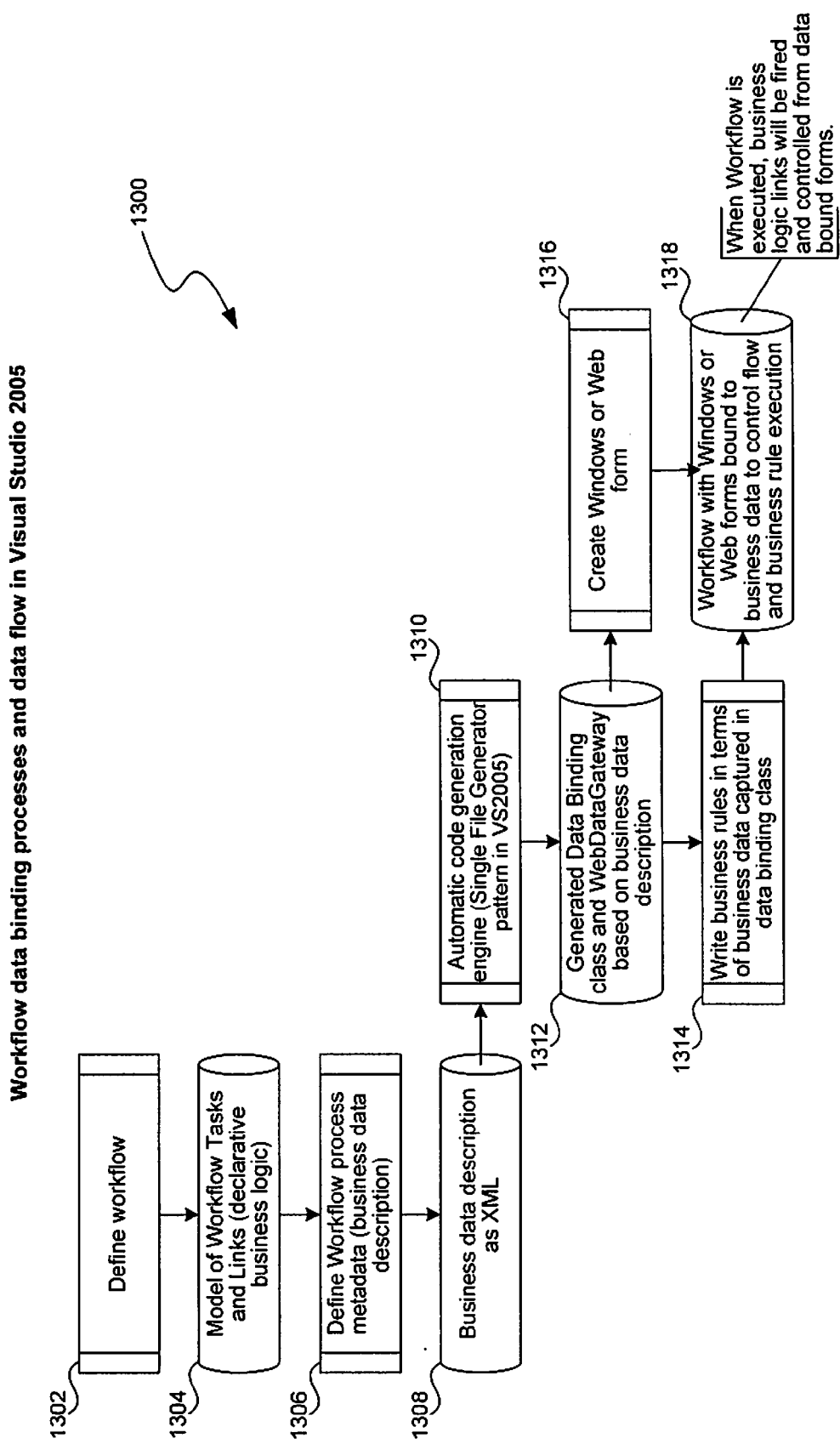
FIG. 13 is a flow diagram illustrating a data binding process and data flow.

FIG. 13 is a flow diagram illustrating a data binding process and data flow. In the process 1300, a workflow is defined at block 1302. As an example, a software developer can define a workflow. The workflow data binding system can store 1304 a model of the workflow tasks (e.g., boxes on the form) and links between the boxes, such as in a workflow database. This information can be stored in a declarative manner. At block 1306, the software developer can specify metadata, such as the business data description. As an example, the software developer can specify data fields associated with an expense report. The specified metadata can be stored 1308, such as in an XML file or other data repository. At block 1310, the workflow data binding system can generate code and can include a class definition corresponding to the generated objects. The workflow data binding system can store 1312 the generated data binding class. The software developer can then provide business rules corresponding to the workflow data at block 1314. As an example, the software developer can specify what actions need to be taken based on workflow metadata. At block 1316, the software developer can create a form, such as a Windows® form or a Web form. The form can include data-bound controls, such as to provide or receive workflow data. The workflow data binding system binds 1318 the data-bound controls on the form with workflow data so that data is retrieved or stored, as appropriate. When the workflow logic executes, the forms will cause business logic to also be executed.

V. Conclusion

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the workflow data binding system is not intended to be exhaustive or to limit the workflow data binding system to the precise form disclosed above. While specific embodiments of, and examples for, the workflow data binding system are described above for illustrative purposes, various equivalent modifications are possible within the scope of the workflow data binding system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively.

The teachings of the workflow data binding system provided herein can be applied to other systems, not necessarily the system described herein. The elements and acts of the various embodiments described above can be combined to provide further embodiments.

This application is related to commonly assigned U.S. patent application Ser. No. 10/938,396, also filed on Sep. 10, 2004, which is incorporated by reference. Aspects of the workflow data binding system can be modified, if necessary, to employ the systems, functions, and concepts of the various references described above to provide yet further embodiments of the workflow data binding system.

These and other changes can be made to the workflow data binding system in light of the above Detailed Description. While the above description details certain embodiments of the workflow data binding system and describes the best mode contemplated, no matter how detailed the above appears in text, the workflow data binding system can be practiced in many ways. As noted above, particular terminology used when describing certain features or aspects of the workflow data binding system should not be taken to imply that the terminology is being redefined herein to be restricted to any specific characteristics, features, or aspects of the workflow data binding system with which that terminology is associated. In general, the terms used in the following claims should not be construed to limit the workflow data binding system to the specific embodiments disclosed in the specification, unless the above Detailed Description section explicitly defines such terms. Accordingly, the actual scope of the workflow data binding system encompasses not only the disclosed embodiments, but also all equivalent ways of practicing or implementing the workflow data binding system under the claims.

While certain aspects of the workflow data binding system are presented below in certain claim forms, the inventors contemplate the various aspects of the workflow data binding system in any number of claim forms. For example, while only one aspect of the workflow data binding system is recited as embodied in a computer-readable medium, other aspects may likewise be embodied in a computer-readable medium. Accordingly, the inventors reserve the right to add additional claims after filing the application to pursue such additional claim forms for other aspects of the workflow data binding system.

We claim:

1. A method for workflow data binding, comprising:
providing, by a computer having a processor and a memory, a graphical user interface (GUI) of a workflow application for modeling a workflow;
storing the workflow, the workflow having workflow objects and one or more connectors between the workflow objects, the workflow objects including a first workflow object, the one or more connectors including a first connector associated with the first workflow object;
storing, in an Extensible Markup Language (XML) file, workflow data as metadata associated with the first workflow object or the first connector, the metadata specified in the XML file via the GUI;
a workflow data binding system automatically generating a class definition file based at least in part on the metadata specified in the XML file, the class definition file defining classes;
dynamically generating objects for transforming the XML file such that the first workflow object can be bound to a data object in a data store, the generated objects associated with the classes defined in the class definition file; and
storing the generated objects for subsequent use by a workflow engine.

2. The method according to claim 1, further comprising:
determining that the XML file associated with the first workflow object has been modified; and
dynamically re-generating the objects based at least in part on the modified XML file.

3. The method according to claim 1, wherein the class definition file is generated in response to the data object being dropped on the first workflow object via the GUI of the workflow application.

4. The method according to claim 1, wherein the data object comprises an XML data object for holding data captured during execution of a process associated with the first workflow object.

5. The method according to claim 1, wherein the data object comprises a database data object from a workflow database in the data store for attaching the first workflow object to one or more database tables in the workflow database.

6. The method according to claim 1, wherein the classes comprise a first class and a second class, the first class having one or more properties transformed from the metadata associated with the first workflow object or the first connector, the second class having the first class and one or more methods for operating on the first class and the data object in the data store.

7. The method according to claim 1, further comprising:
receiving, via the GUI of the workflow application, one or more rules corresponding to the workflow data; and
binding data-bound controls on a form with the workflow data such that when the workflow is executed, the form will cause the one or more rules to also be executed.

8. A computer program product comprising at least one non-transitory computer readable medium storing instructions executable by a computer to perform:
providing a graphical user interface (GUI) of a workflow application for modeling a workflow;
storing the workflow, the workflow having workflow objects and one or more connectors between the workflow objects, the workflow objects including a first workflow object, the one or more connectors including a first connector associated with the first workflow object;
storing, in an Extensible Markup Language (XML) file, workflow data as metadata associated with the first workflow object or the first connector, the metadata specified in the XML file via the GUI;
automatically generating a class definition file based at least in part on the metadata specified in the XML file, the class definition file defining classes;
dynamically generating objects for binding the first workflow object with a data object in a data store, the generated objects associated with the classes defined in the class definition file; and
storing the generated objects for subsequent use by a workflow engine.

9. The computer program product of claim 8, wherein the instructions are further executable by the computer to perform:
determining that the XML file associated with the first workflow object has been modified; and
dynamically re-generating the objects based at least in part on the modified XML file.

10. The computer program product of claim 8, wherein the class definition file is generated in response to the data object being dropped on the first workflow object via the GUI of the workflow application.

11. The computer program product of claim 8, wherein the data object comprises an XML data object for holding data captured during execution of a process associated with the first workflow object.

12. The computer program product of claim 8, wherein the data object comprises a database data object from a workflow database in the data store for attaching the first workflow object to one or more database tables in the workflow database.

13. The computer program product of claim 8, wherein the classes comprise a first class and a second class, the first class having one or more properties transformed from the metadata associated with the first workflow object or the first connector, the second class having the first class and one or more methods for operating on the first class and the data object in the data store.

14. The computer program product of claim 8, wherein the instructions are further executable by the computer to perform:
receiving, via the GUI of the workflow application, one or more rules corresponding to the workflow data; and
binding data-bound controls on a form with the workflow data such that when the workflow is executed, the form will cause the one or more rules to also be executed.

15. A system for workflow data binding, comprising:
at least one processor;
at least one non-transitory computer readable medium storing instructions executable by the at least one processor to perform:
providing a graphical user interface (GUI) of a workflow application for modeling a workflow;
storing the workflow, the workflow having workflow objects and one or more connectors between the workflow objects, the workflow objects including a first workflow object, the one or more connectors including a first connector associated with the first workflow object;

storing, in an Extensible Markup Language (XML) file, workflow data as metadata associated with the first workflow object or the first connector, the metadata specified in the XML file via the GUI;

automatically generating a class definition file based at least in part on the metadata specified in the XML file, the class definition file defining classes;

dynamically generating objects for binding the first workflow object with a data object in a data store, the generated objects associated with the classes defined in the class definition file; and storing the generated objects for subsequent use by a workflow engine.

16. The system of claim 15, wherein the instructions are further executable by the computer to perform:

determining that the XML file associated with the first workflow object has been modified; and dynamically re-generating the objects based at least in part on the modified XML file.

17. The system of claim 15, wherein the class definition file is generated in response to the data object being dropped on the first workflow object via the GUI of the workflow application.

18. The system of claim 15, wherein the data object comprises an XML data object for holding data captured during execution of a process associated with the first workflow object.

19. The system of claim 15, wherein the data object comprises a database data object from a workflow database in the data store for attaching the first workflow object to one or more database tables in the workflow database.

20. The system of claim 15, wherein the classes comprise a first class and a second class, the first class having one or more properties transformed from the metadata associated with the first workflow object or the first connector, the second class having the first class and one or more methods for operating on the first class and the data object in the data store.

21. The system of claim 20, wherein the instructions are further executable by the computer to perform:

receiving, via the GUI of the workflow application, one or more rules corresponding to the workflow data; and binding data-bound controls on a form with the workflow data such that when the workflow is executed, the form will cause the one or more rules to also be executed.

* * * * *